(12) United States Patent
Tanabe et al.

(10) Patent No.: US 8,165,579 B2
(45) Date of Patent: Apr. 24, 2012

(54) COMMUNICATION SYSTEM AND COMMUNICATION METHOD

(75) Inventors: Akimichi Tanabe, Kawasaki (JP); Naomasa Yoshida, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 813 days.

(21) Appl. No.: 12/160,434

(22) PCT Filed: Jan. 9, 2007

(86) PCT No.: PCT/JP2007/050065
§ 371 (c)(1),
(2), (4) Date: Aug. 19, 2008

(87) PCT Pub. No.: WO2007/080844
PCT Pub. Date: Jul. 19, 2007

(65) Prior Publication Data
US 2010/0159923 A1    Jun. 24, 2010

(30) Foreign Application Priority Data
Jan. 10, 2006    (JP) ................. P2006-002788

(51) Int. Cl.
*H04W 4/00* (2009.01)
*H04M 1/00* (2006.01)
*H04L 12/66* (2006.01)

(52) U.S. Cl. .......... 455/432.1; 455/435.1; 455/552.1; 370/356

(58) Field of Classification Search ........ 455/432.1, 455/433, 435.1, 445; 370/236
See application file for complete search history.

(56) References Cited

U.S. PATENT DOCUMENTS

| 7,190,687 | B1 | 3/2007 | Hsu et al. | |
| 7,383,044 | B2 * | 6/2008 | Bleckert et al. | 455/433 |
| 7,664,495 | B1 * | 2/2010 | Bonner et al. | 455/433 |

(Continued)

FOREIGN PATENT DOCUMENTS

JP    4-82334    3/1992
(Continued)

OTHER PUBLICATIONS

Jun Kakishima, et al., "Fukusu Musen Access System-kan Chosei no Tameno MASC (Multi-Access System Coordinator) Kino", Technical Report of IEICE, NS2004-128, Oct. 2004, pp. 17-20 (with English Abstract).

(Continued)

*Primary Examiner* — Christopher M Brandt
*Assistant Examiner* — Scott Au
(74) *Attorney, Agent, or Firm* — Oblon, Spivak, McClelland, Maier & Neustadt, L.L.P.

(57) ABSTRACT

A communication system and communication method with which an incoming call processing can be prevented from falling into a loop state when a communication mode for the incoming call destination is determined. When an inquiry reception unit receives an inquiry signal representing an incoming call destination inquiry from a GMSC, a flag judgment unit judges whether an identification flag has been added. In cases where judgment is made that an identification flag has not been added, a response unit sends back a routing number of a CCCF/NeDS assigned to the GMSC and, in cases where judgment is made that an identification flag has been added, a VMSC inquiry unit acquires in-range information regarding the mobile device from a VMSC which is a visited mobile-services switching center, and the acquired in-range information acquired by the response unit is sent back to the GMSC.

4 Claims, 14 Drawing Sheets

U.S. PATENT DOCUMENTS

2004/0242227 A1* 12/2004 Huotari et al. ............. 455/432.1
2008/0268818 A1* 10/2008 Keller et al. ............. 455/414.1

FOREIGN PATENT DOCUMENTS

| JP | 11-331063 | 11/1999 |
|---|---|---|
| JP | 2003-169379 | 6/2003 |
| JP | 2007-60181 | 3/2007 |
| KR | 10-1999-0053162 | 7/1999 |
| RU | 2265965 C2 | 2/2004 |
| WO | WO 2004/099940 A2 | 11/2004 |

OTHER PUBLICATIONS

Atsushi Iwasaki, et al., "IP$^2$ ni Okeru Service Session Seigyo to Mobility/Qos Seigyo no Renkei Hoshiki", General Conference of IEICE Communication Society, 2005, B-6-12,Mar. 2005, p. 12, (with English translation).

"3GPP"3GPPTR 23.806 V7.0.0(Dec. 2005) 3$^{rd}$ Generation Partnership Project; Technical Specification Group Services and System Aspects; Voice Call Continuity between CS and IMS study (Realease 7), 3GPP, Dec. 25, 2005, pp. 1-110.

"3GPP TR 23.806 V7.0.0; Annex E: "Call Reestablishment on Domain Tranfer" for IMS-controlled static anchoring", 3GPP,Dec. 2002, pp. 111-152.

Extended European Search Report issued Nov. 23, 2011, in Patent Application No. 07706412.9.

"Technical Specification Group Core Network; Customised Application for Mobile network Enhanced Logic (CAMEL)", 3$^{rd}$ Generation Partnership Project, 3GPP TS 23.078 V7.2.0, Phase 4, Stage 2 (Release 7), XP 002661789, Dec. 1, 2005, pp. 493-495.

* cited by examiner

COMMUNICATION SYSTEM AND COMMUNICATION METHOD

TECHNICAL FIELD

The present invention relates to a communication system and communication method which employ a public mobile communications network.

BACKGROUND ART

The cellular phones of recent years possess a wireless LAN communication function in addition to communication functions that is able to perform a telephone call and data communications via a normal public mobile communications network. Furthermore, these cellular phones are able to perform a telephone call or data communications by connecting to a wireless LAN via an access point. Here, the user holding the cellular phone sometimes moves outside the communication range of the base station when moving while performing a telephone call or data communications using a normal communication function. Here, in cases where it is possible to connect to an access point, performing a call using the wireless LAN via the access point and handover between different so-called communication modes may be considered. For example, NonPatent Document 1 discloses a communication system which comprises a CCCF/NeDS (Call Continuity Control Function/Network Domain Selection) for performing handover between different communication modes in this context.

[NonPatent Document 1] 3GPP "3GPPTR 23.806 V7.0.0 (2005-12) 3rd Generation Partnership Project; Technical Specification Group Services and System Aspects; Voice Call Continuity between CS and IMS Study (Release 7)", page 40, 6.3.4 Origination, [online], Dec. 25, 2005, Jan. 6, 2006, Internet <URL: http://www.3 gpp.org/ftp/Specs/archive/23_series/23.806/>

DISCLOSURE OF THE INVENTION

Problem to be Solved by the Invention

Here, the processing of the communication system that appears in NonPatent Document 1 will be described by using the drawings. FIG. 14 is a network constitutional view of the network constitution of the overall communication system.

When an incoming signal is issued by a mobile device 100, the incoming signal passes via several GMSC (Gateway Mobile Switching Center) and an incoming call destination inquiry is sent to the HSS (Home Subscriber Server) by the final GMSC (S11, S12). Although the HSS normally acquires the routing number MSRN of the incoming call destination mobile device from the VMSC, the CCCF/NeDS, which is a mechanism whereby handover is considered, must be made to determine the domain once. Hence, a provisional routing number RN (Routing Number) indicating the CCCF/NeDS is assigned by the HSS and the provisional routing number RN is sent back thereby (S13). The GMSC uses the provisional routing number RN to output an incoming signal for CCCF/NeDS (Call Continuity Control Function/Network Domain Selection) which is an application server to an MGCF (Media Gateway Control Function) (S14).

The MGCF outputs an incoming signal to the CCCF/NeDS via an S-CSCF (Serving-Call State Control Function) which is a call control server for the wireless LAN (S15, S16). The CCCF/NeDS makes a determination of the domain for switching the communication mode and outputs an incoming signal for arrival at the domain (S17). Here, a connection to the CS (Circuit Switch) domain (public mobile communications network or the like) is determined. Further, an incoming signal (including the telephone number of the incoming call destination communication terminal) is output to the GMSC via the S-CSCF and MGCF (S18, S19).

Here, the GMSC is unable to judge whether an incoming signal from a communication terminal is received or whether an incoming signal from the MGCF is received. Therefore, the GMSC once again issues an incoming call destination inquiry to the HSS on the basis of the incoming signal. The HSS is also similarly unable to judge whether the inquiry is an incoming call destination inquiry based on an incoming signal from the communication terminal or an incoming call destination inquiry based on an incoming signal sent back by the CCCF/NeDS. Hence, the HSS once again performs processing to assign a provisional routing number RN which represents the CCCF/NeDS and sends back the assigned provisional routing number RN as is to the GMSC. Hence, there is the problem that the processing enters a loop state as a result of performing the above processing once again.

Therefore, in order to resolve the above problems, an object of the present invention is to provide a communication system and communication method with which the incoming signal processing can be prevented from falling into a loop state when the communication mode is determined.

Means for Solving the Problem

In order to solve the above problems, the communication system of the present invention comprises a visited mobile-services switching center which stores in-range information regarding a mobile device and performs communication processing for the mobile device; a home subscriber server which acquires in-range information regarding an incoming call destination from the visitor mobile-services switching center; an application server which determines a communication mode for the incoming call destination; and a gateway mobile switching center which, upon receipt of an incoming signal, transmits an inquiry signal which represents an incoming call destination inquiry to the home subscriber server and which, upon receipt of a response of access information indicating the incoming call destination from the home subscriber server, transmits an incoming signal to a destination, based on the access information, wherein the home subscriber server comprises flag judgment means for judging whether an identification flag has been added upon receipt of an inquiry signal which represents an incoming call destination inquiry from the gateway mobile switching center; and response means for sending back access information indicating the access destination of the application server to the gateway mobile switching center in cases where judgment is made by the flag judgment means that the identification flag has not been added and, in cases where judgment is made that the identification flag has been added, acquiring in-range information regarding the mobile device from the visitor mobile-services switching center and sending back the acquired in-range information to the gateway mobile switching center; and the application server comprises addition means for receiving an incoming signal from the gateway mobile switching center, performing determination processing to determine the communication mode for the incoming call destination, and adding an identification flag indicating that the determination processing has been completed to the incoming signal; and response means for sending back the incoming signal, to which the identification flag has been added by the addition means, to the gateway mobile switching center.

Furthermore, the communication method of the present invention is a communication method for a communication system having a visited mobile-services switching center which stores in-range information regarding a mobile device and performs communication processing for the mobile device, a home subscriber server which acquires in-range information regarding an incoming call destination from the visitor mobile-services switching center, an application server which determines a communication mode for the incoming call destination; and a gateway mobile switching center which, upon receipt of an incoming signal, transmits an inquiry signal which represents an incoming call destination inquiry to the home subscriber server and which, upon receipt of a response of access information indicating the incoming call destination from the home subscriber server, transmits an incoming signal to a destination, based on the access information, the communication method comprising: an addition step in which, upon receipt of an incoming signal from the gateway mobile switching center, the application server performs determination processing to determine a communication mode for the incoming call destination and adds an identification flag which indicates that the determination processing has been completed to the incoming signal; and a response step in which the application server sends back an incoming signal, to which the identification flag is added in the addition step, to the gateway mobile switching center, the communication method further comprising: a flag judgment step in which, upon receipt of an inquiry signal which represents an incoming call destination inquiry from the gateway mobile switching center, the home subscriber server judges whether an identification flag has been added; and a response step in which, in cases where judgment is made in the flag judgment step that the identification flag has not been added, the home subscriber server sends back access information indicating an access destination of the application server to the gateway mobile switching center and, in cases where judgment is made that the identification flag has been added, acquires in-range information regarding the mobile device from the visitor mobile-services switching center and sends back the acquired in-range information to the gateway mobile switching center.

According to the present invention, upon receipt of an inquiry signal which represents an incoming call destination inquiry from the gateway mobile switching center, the home subscriber server judges whether an identification flag has been added. In cases where judgment is made that an identification flag has not been added, the home subscriber server is able to send back access information indicating an access destination of the application server to the gateway mobile switching center and, in cases where judgment is made that an identification flag has been added, the home subscriber server is able to acquire in-range information regarding the mobile device from the visitor mobile-services switching center and send back the acquired in-range information to the gateway mobile switching center. Upon receipt of an incoming signal from the gateway mobile switching center, the application server is able to perform determination processing to determine a communication mode for the incoming call destination, add an identification flag which indicates that the determination processing has bee completed to the incoming signal, and send back an incoming signal to which an identification flag has been added to the gateway mobile switching center. As a result, the gateway mobile switching center is able to prevent a processing loop state resulting from the repetition of an inquiry to the home subscriber server whenever an incoming signal is received.

Furthermore, the communication system of the present invention is a communication system, comprising a visited mobile-services switching center which stores in-range information regarding a mobile device and performs communication processing for the mobile device; a home subscriber server which acquires in-range information regarding an incoming call destination from the visitor mobile-services switching center; an application server which determines a communication mode for the incoming call destination; and a gateway mobile switching center which, upon receipt of an incoming signal, transmits an inquiry signal which represents an incoming call destination inquiry to the home subscriber server and which, upon receipt of a response of access information indicating the incoming call destination from the home subscriber server, transmits an incoming signal to a destination, based on the access information, wherein the home subscriber server comprises: storage means for storing call source information which indicates a call source; judgment means for judging whether call source information which indicates the call source of the incoming signal has been stored in the storage means, upon receipt of an inquiry signal from the gateway mobile switching center, and, in cases where judgment is made that the call source information has not been stored in the storage means, causing the storage means to store call source information which indicates the call source of the incoming signal; and response means for sending back access information of the application server to the gateway mobile switching center in cases where judgment is made by the judgment means that call source information has not been stored in the storage means and for sending back access information of the incoming call destination from the visitor mobile-services switching center to the gateway mobile switching center in cases where judgment is made by the judgment means that the call source information has been stored in the storage means.

Furthermore, the communication method of the present invention is a communication method for a communication system having a visited mobile-services switching center which stores in-range information regarding a mobile device and performs communication processing for the mobile device, a home subscriber server which acquires in-range information regarding an incoming call destination from the visitor mobile-services switching center, an application server which determines a communication mode for the incoming call destination, and a gateway mobile switching center which, upon receipt of an incoming signal, transmits an inquiry signal which represents an incoming call destination inquiry to the home subscriber server and which, upon receipt of a response of access information indicating the incoming call destination from the home subscriber server, transmits an incoming signal to a destination, based on the access information, the communication method comprising: a judgment step in which, upon receipt of an inquiry signal from the gateway mobile switching center, the home subscriber server judges whether call source information which indicates a call source of the incoming signal has been stored in the storage means; a storage step in which, in cases where judgment is made that call source information has not been stored in the storage means, the home subscriber server causes the storage means to store the call source information which indicates the call source of the incoming signal; and a response step in which, in cases where judgment is made in the judgment step that call source information has not been stored in the storage means, the home subscriber server sends back access information of the application server to the gateway mobile switching center and, in cases where judgment is made in the judgment step that the call source information has been stored in the storage means, sends back access information regarding the incoming call destination from the visitor mobile-services switching center to the gateway mobile switching center.

According to this invention, upon receipt of an inquiry signal from the gateway mobile switching center, the home subscriber server judges whether call source information which indicates a call source of the incoming signal is stored in the storage means and, in cases where judgment is made that call source information has not been stored in the storage means, the home subscriber server is able to cause the storage means to store call source information which indicates the call source of the incoming signal and, in cases where judgment is made that call source information has not been stored in the storage means, the home subscriber server is able to send back access information of the application server to the gateway mobile switching center and, in cases where judgment is made that call source information has been stored in the storage means, access information regarding the incoming call destination can be sent back from the visitor mobile-services switching center to the gateway mobile switching center. As a result, the gateway mobile switching center is able to prevent a processing loop state resulting from the repetition of an inquiry for the home subscriber server whenever the gateway mobile switching center receives an incoming signal.

In addition, the communication system of the present invention comprises a visited mobile-services switching center which stores in-range information regarding a mobile device and performs communication processing for the mobile device; a home subscriber server which acquires in-range information regarding an incoming call destination from the visitor mobile-services switching center; an application server which determines a communication mode for the incoming call destination; and a gateway mobile switching center which, upon receipt of an incoming signal, transmits an inquiry signal which represents an incoming call destination inquiry to the home subscriber server and which, upon receipt of a response of access information indicating the incoming call destination from the home subscriber server, transmits an incoming signal to a destination, based on the access information, wherein the home subscriber server comprises: inquiry source judgment means for judging whether an inquiry signal has been received from the gateway mobile switching center or whether an inquiry signal has been received from the application server; and response means for sending back access information of the incoming call destination acquired from the visitor mobile-services switching center in cases where judgment is made by the inquiry source judgment means that an inquiry signal has been received from the application server, and for sending back access information of the application server in cases where judgment is made that an inquiry signal has been received from the gateway mobile switching center, and wherein the application server comprises: inquiry means for selecting, in cases where an incoming signal is received, a communication mode for the incoming call destination and transmitting an inquiry signal relating to incoming call destination access information to the home subscriber server; and communication processing means for performing communication processing by using access information in cases where the access information regarding the incoming call destination is received in response to the inquiry signal transmitted by the inquiry means.

Further, the communication method of the present invention is a communication method for a communication system having a visited mobile-services switching center which stores in-range information regarding a mobile device and performs communication processing for the mobile device, a home subscriber server which acquires in-range information regarding an incoming call destination from the visitor mobile-services switching center, an application server which determines a communication mode for the incoming call destination, and a gateway mobile switching center which, upon receipt of an incoming signal, transmits an inquiry signal which represents an incoming call destination inquiry to the home subscriber server and which, upon receipt of a response of access information indicating the incoming call destination from the home subscriber server, transmits an incoming signal to a destination, based on the access information, the communication method comprising: an inquiry source judgment step in which the home subscriber server judges whether an inquiry signal has been received from the gateway mobile switching center or whether an inquiry signal has been received from the application server; and a response step in which, in cases where judgment is made in the inquiry source judgment step that an inquiry signal has been received from the application server, the home subscriber server sends back access information regarding the incoming call destination acquired from the visitor mobile-services switching center and, in cases where judgment is made that an inquiry signal has been received from the gateway mobile switching center, sends back access information of the application server, the communication method further comprising: an inquiry step in which, in cases where an incoming signal is received, the application server selects a communication mode for the incoming call destination and transmits an inquiry signal relating to the access information of the incoming call destination to the home subscriber server; and a communication processing step in which the application server performs communication processing by using the access information in cases where the access information regarding the incoming call destination is received in response to the inquiry signal transmitted in the inquiry step.

According to the present invention, the home subscriber server judges whether an inquiry signal has been received from the gateway mobile switching center or whether an inquiry signal has been received from the application serve and, in cases where judgment is made that an inquiry signal has been received from the application server, the home subscriber server is able to send back access information of the incoming call destination acquired from the visitor mobile-services switching center and, in cases where judgment is made that an inquiry signal has been received from the gateway mobile switching center, access information of the application server can be sent back, the communication method for the communication system further comprising: an inquiry step in which, in cases where an incoming signal is received, the application server is able to select a communication mode for the incoming call destination and transmit an inquiry signal relating to the access information of the incoming call destination to the home subscriber server; and a communication processing step in which the application server is able to perform communication processing by using the access information in cases where access information regarding the incoming call destination is received in response to the transmitted inquiry signal. As a result, the gateway mobile switching center is able to prevent a processing loop state resulting from the repetition of an inquiry for the home subscriber server whenever the gateway mobile switching center receives an incoming signal.

Effects of the Invention

The present invention is able to prevent to enter a processing loop state by querying repeatedly to the home subscriber server whenever the gateway mobile switching center receives an incoming signal.

LIST OF ELEMENTS

Figure 1:
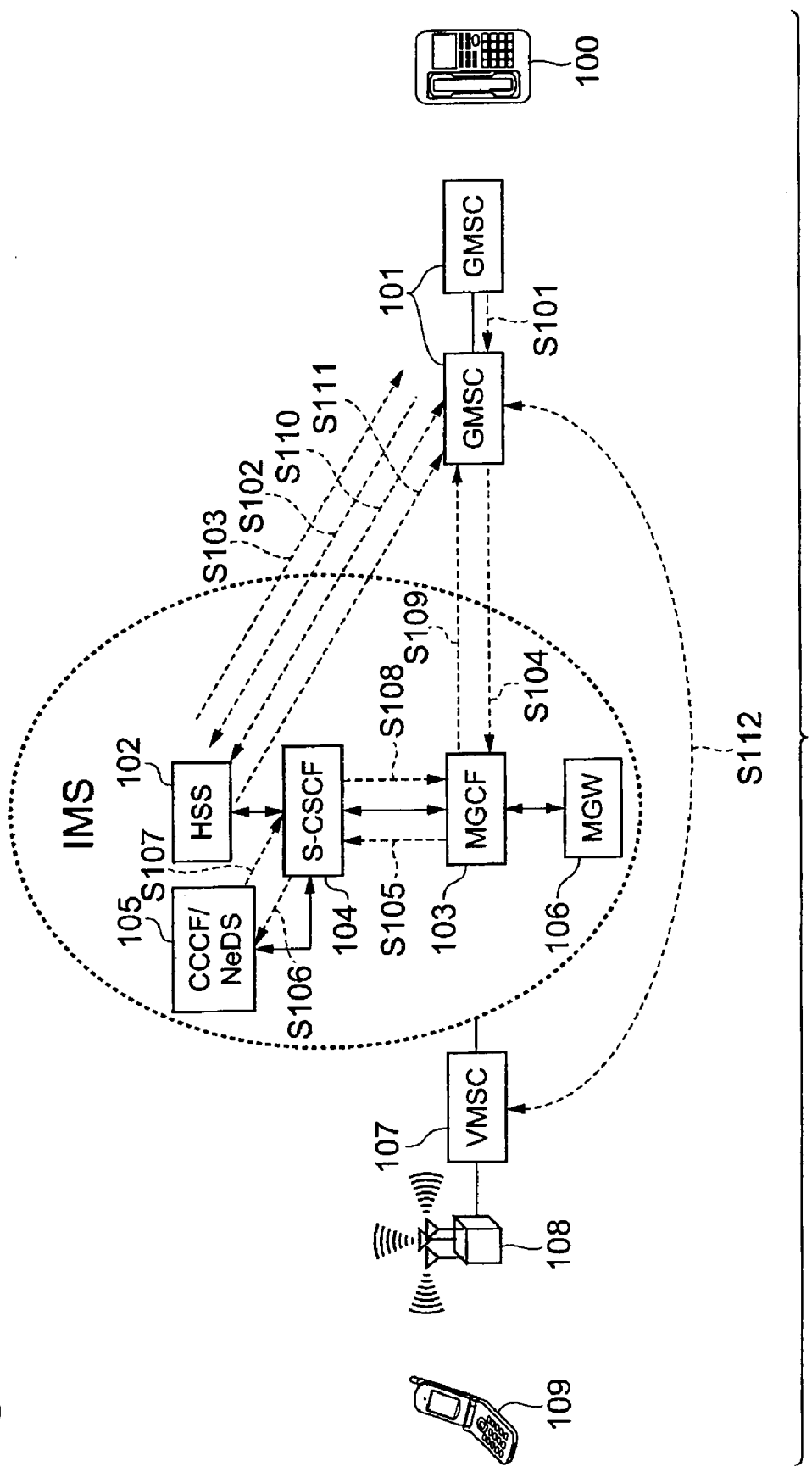
FIG. 1 is a system constitutional view of a communication system of a first embodiment.

100 . . . mobile device, 101 . . . GMSC, 102, 102A, 102B . . . HSS, 103 . . . MGCF, 104 . . . S-CSCF, 105, 105A, 105B . . . CCCF/NeDS, 106 . . . MGW, 107 . . . VMSC, 108 . . . base station, 109 . . . mobile device.

BEST MODE FOR CARRYING OUT THE INVENTION

The present invention can be easily understood by considering the detailed description hereinbelow with reference to the attached drawings which are shown for an embodiment. Embodiments of the present invention will then be described with reference to the attached drawings. Repetitive description is avoided by assigning the same reference numerals to the same parts wherever possible.

First Embodiment

FIG. 1 is a system constitutional view of a communication system of the first embodiment. The communication system of the first embodiment comprises a GMSC (Gateway Mobile Switching Center) 101, an HSS (Home Subscriber Server) 102, an MGCF (Media Gateway Control Function) 103, an S-CSCF (Serving-Call State Control Function) 104, a CCCF/NeDS (Call Continuity Control Function/Network Domain Selection) 105, MGW (Media Gateway) 106, and a VMSC (Visitor Mobile-services Switching Center) 107. Of these parts, the HSS 102, MGCF 103, S-CSCF 104, CCCF/NeDS 105, and MGW 106 are configured as an IMS (IP Multimedia Subsystem). The respective constitutions of these parts will be described hereinbelow.

The GMSC 101 is a Gateway Mobile Switching Center and a switching center for connecting the networks. In this embodiment, a plurality of GMSC 101 are shown to exist between the IMS and the mobile device 100. Upon receipt of an incoming signal from the mobile device 100 or MGCF 103, the GMSC 101 performs incoming call destination inquiry processing for the HSS 102 and therefore transmits an inquiry signal including the incoming call destination telephone number or the like to the HSS 102. In cases where an incoming signal from the MGCF 103 is received, an identification flag indicating that the system for communicating with the CS domain (public mobile communications network or the like) has been determined for the CCCF/NeDS 105 is added to the inquiry signal.

Upon receipt of the routing number indicating the access destination in response to the inquiry signal from the HSS 102, the GMSC 101 performs access processing for the access destination indicated by the received routing number. For example, in cases where a routing number RN which indicates the CCCF/NeDS 105 as the access destination is received from the HSS 102, the GMSC 101 performs communication control to connect to the CCCF/NeDS 105 via the MGCF 103 and S-CSCF 104. In addition, in cases where a routing number MSRN indicating the incoming call destination mobile device as the access destination is received from the HSS 102, the GMSC 101 performs a communication connection with the VMSC 107 via the MGCF 103 and MGW 106. The GMSC 101 then performs a communication connection with a mobile device 109 which is the incoming call destination via the VMSC 107 and base station 108.

The HSS 102 is a server for managing the authentication function and subscriber information of the 3G network. In this embodiment, the HSS 102 judges whether an identification flag has been added to the inquiry signal upon receipt of an inquiry signal representing an incoming call destination inquiry from the GMSC 101. In cases where it is judged that an identification flag has been added to the inquiry signal, the HSS 102 acquires a routing number MSRN indicating mobile device position information from the VMSC 107 and sends back the acquired routing number MSRN to the GMSC 101. Furthermore, in cases where it is judged that an identification flag has not been added to the inquiry signal, the HSS 102 sends back a provisional routing number RN indicating the CCCF/NeDS 105 to the GMSC 101.

The MGCF 103 is a server which performs conversion of control signals between the CS and IMS and controls the MGW 106. Furthermore, the MGCF 103 is a server which performs communication control to transmit incoming signals from the GMSC 101 to the CCCF/NeDS 105. The MGCF 103 connects to the CCCF/NeDS 105 in accordance with the routing number contained in the incoming signal transmitted by the GMSC 101.

The S-CSCF 104 is an IMS calling control server which has the same functions as an SIP server of an IP call. In cases where it is determined that the CCCF/NeDS 105 is to perform a communication connection with a wireless LAN, the S-CSCF 104 performs call control to perform the communication connection with the wireless LAN in accordance with this determination.

The CCCF/NeDS 105 is an IMS application server that is utilized in VCC (Voice Call Continuity) and is a server for determining the communication mode during so-called handover. The CCCF/NeDS 105 is able to determine, in accordance with the predetermined standard, whether to perform CS domain (public mobile communications network or the like) communications or perform communications via the wireless LAN. For example, the CCCF/NeDS 105 may switch the wireless LAN and public mobile communications network so that the user is not charged more than the designated fee and may switch the wireless LAN and public mobile communications network in accordance with the operator policy of the CCCF/NeDS 105. It is also possible to switch to a communication mode with a more suitable communication state in accordance with the communication status (strength or weakness or the like of the radio waves) of the mobile device of the incoming call destination. Furthermore, switching for a communication connection using a non-communicating communication mode may also be implemented depending on whether the incoming call destination mobile device is communicating.

The MGW 106 is a server for performing user data IP conversion.

The VMSC 107 is a public switching center which stores in-range information of the mobile device 109. A plurality of base stations 108 (only one of which is shown in FIG. 1) are connected below the VMSC 107 and are able to perform a communication connection with the mobile device 109 via the base station 108.

The overall operation of the communication system thus constituted will now be described using FIG. 1. The broken lines indicate the processing steps. First, an incoming signal is received by a GMSC 101 after passing between the GMSC 101 (S101). Upon receipt of the incoming signal, the GMSC 101 issues an incoming call destination inquiry request to the HSS 102 by using information which is contained in the incoming signal (incoming call destination telephone number and the telephone number of the call source and so forth). Hence, an inquiry signal is transmitted to the HSS 102 (S102). The existence of an identification flag in the inquiry signal is judged by the HSS 102 and, in cases where it is judged that there is no identification flag, a provisional routing number RN indicating CCCF/NeDS 105 is transmitted to the GMSC 101 (S103).

The GMSC 101 transmits an incoming signal containing a provisional routing number RN to the CCCF/NeDS 105 via the MGCF 103 and S-CSCF 104 (S104, S105, S106). The CCCF/NeDS 105 determines the communication mode for the incoming call destination in accordance with a predetermined standard. Here, it is determined that the incoming signal is received in the CS domain. Further, an identification flag is added to the incoming signal which is received in the CS domain and the resulting signal is sent back to the S-CSCF 104 (S107).

Since, in this embodiment, it is determined that an incoming signal is to be received in the CS domain, the incoming signal at the S-CSCF 104 is received by the GMSC 101 after passing via the MGCF 103 (S108, S109). The GMSC 101 performs processing that is the same as normal incoming signal processing (incoming signal processing by the mobile device) and transmits an incoming call destination inquiry signal to the HSS 102 (S110). Here, an inquiry signal which uses an incoming signal containing an identification flag is transmitted and the existence of an identification flag is judged by the HSS 102. Further, in cases where an identification flag exists, the HSS 102 acquires the routing number MSRN of the incoming call destination mobile device from the VMSC 107 and sends back the routing number MSRN to the GMSC 101 (S111).

The GMSC 101 performs communication connection processing with the VMSC 107 in accordance with the routing number MSRN (S112).

The details of the constitution and operation of the HSS 102 and CCCF/NeDS 105 of the communication system processed in this manner will be described next.

Figure 2:
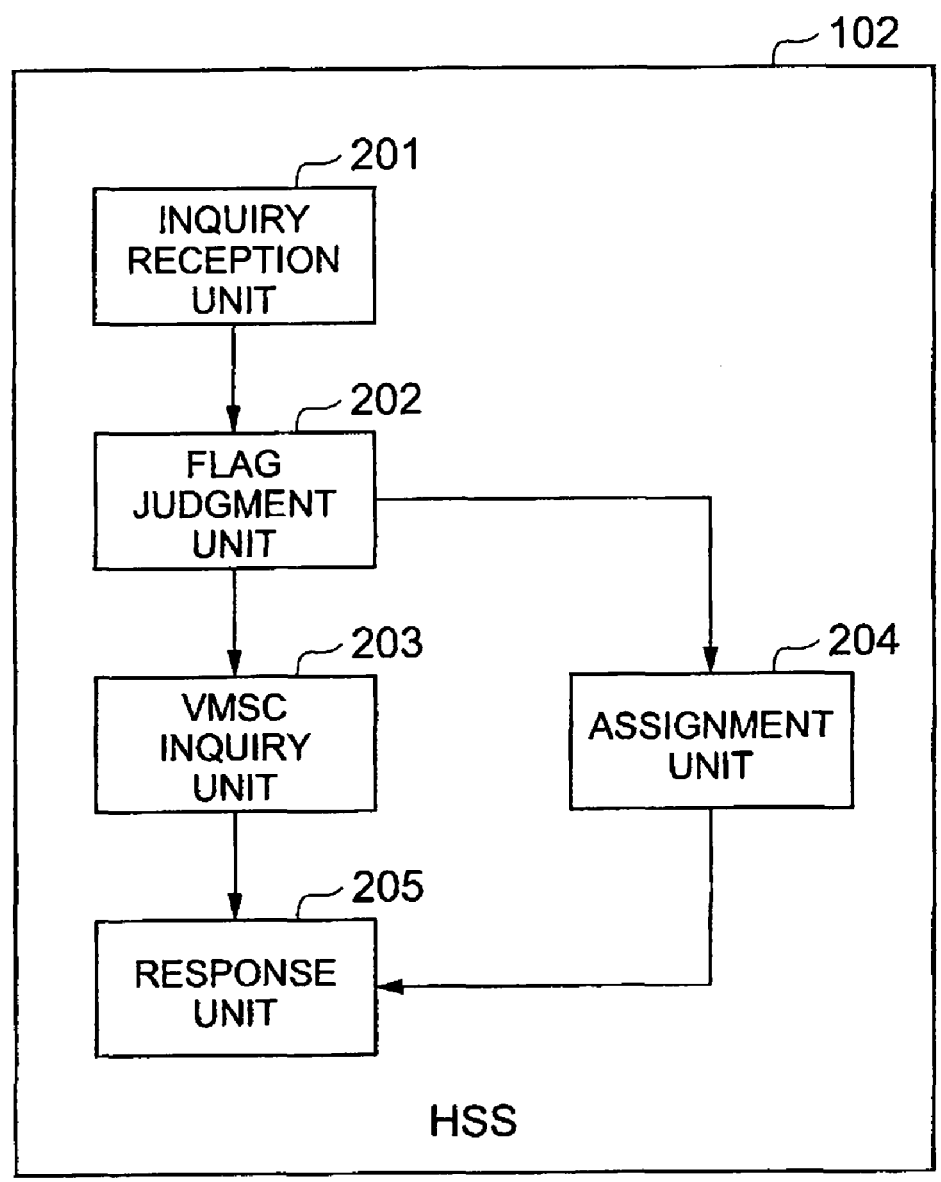
FIG. 2 is a function block diagram of an HSS 102.

FIG. 2 is a function block diagram of the HSS 102. The HSS 102 is constituted comprising an inquiry reception unit 201, a flag judgment unit 202 (flag judgment means), a VMSC inquiry unit 203, an assignment unit 204, and a response unit 205 (response means). Each of these elements will be described hereinbelow.

The inquiry reception unit 201 is a part which receives an inquiry signal from the GMSC 101.

The flag judgment unit 202 is a part which judges whether an identification flag has been added to the inquiry signal received from the GMSC 101. In cases where the flag judgment unit 202 judges that an identification flag exists in accordance with the existence or nonexistence of an identification flag, the flag judgment unit 202 outputs an instruction to acquire position information on the incoming call destination mobile device to the VMSC inquiry unit 203. Furthermore, in cases where it is judged that there is no identification flag, the flag judgment unit 202 outputs an instruction to the assignment unit 204 to assign a provisional routing number RN indicating the CCCF/NeDS 105.

The VMSC inquiry unit 203 acquires the routing number MSRN which indicates position information on the incoming call destination mobile device from the VMSC 107 in accordance with the instruction of the flag judgment unit 202.

The assignment unit 204 assigns a provisional routing number RN indicating the CCCF/NeDS 105 in accordance with an instruction from the flag judgment unit 202 and outputs the assigned routing number RN to the response unit 205.

The response unit 205 is a part which sends back a response signal to the inquiry signal and is a part which sends back the routing number MSRN acquired by the VMSC inquiry unit 203 or the provisional routing number RN to the GMSC 101.

Figure 3:
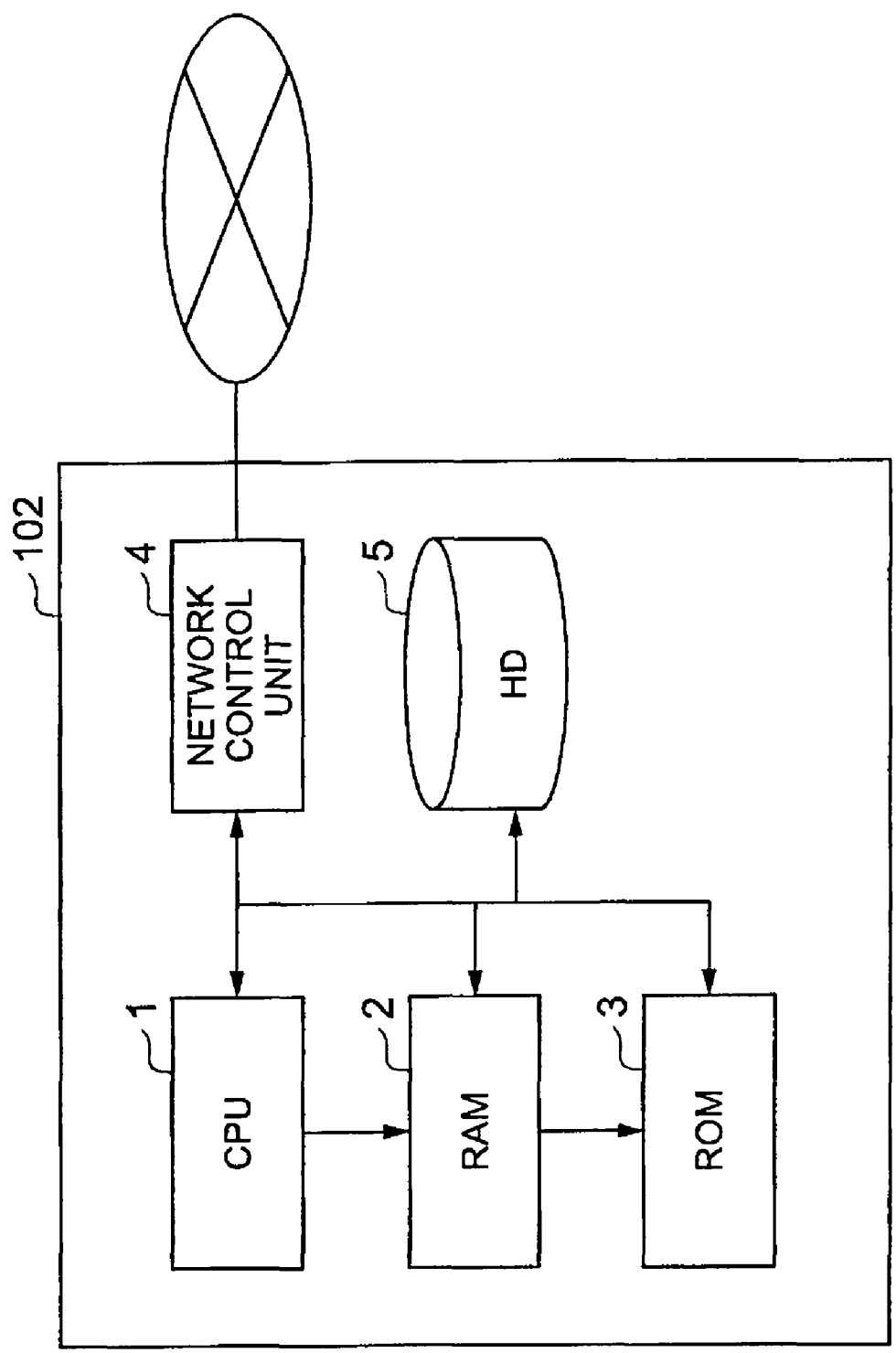
FIG. 3 is a hardware block diagram of the HSS 102.

The HSS 102 constituted in this manner is constituted by the hardware shown in FIG. 3. FIG. 3 is a hardware block diagram of the HSS 102. As shown in FIG. 3, the HSS 102 is constituted by hardware such as a CPU 1, RAM 2, ROM 3, a network control unit 4, and a hard disk (HD) 5, and the CPU 1 is capable of implementing the functions represented by the function blocks above as a result of the CPU 1 operating in accordance with a program stored in the ROM 3 or hard disk 5.

Figure 4:
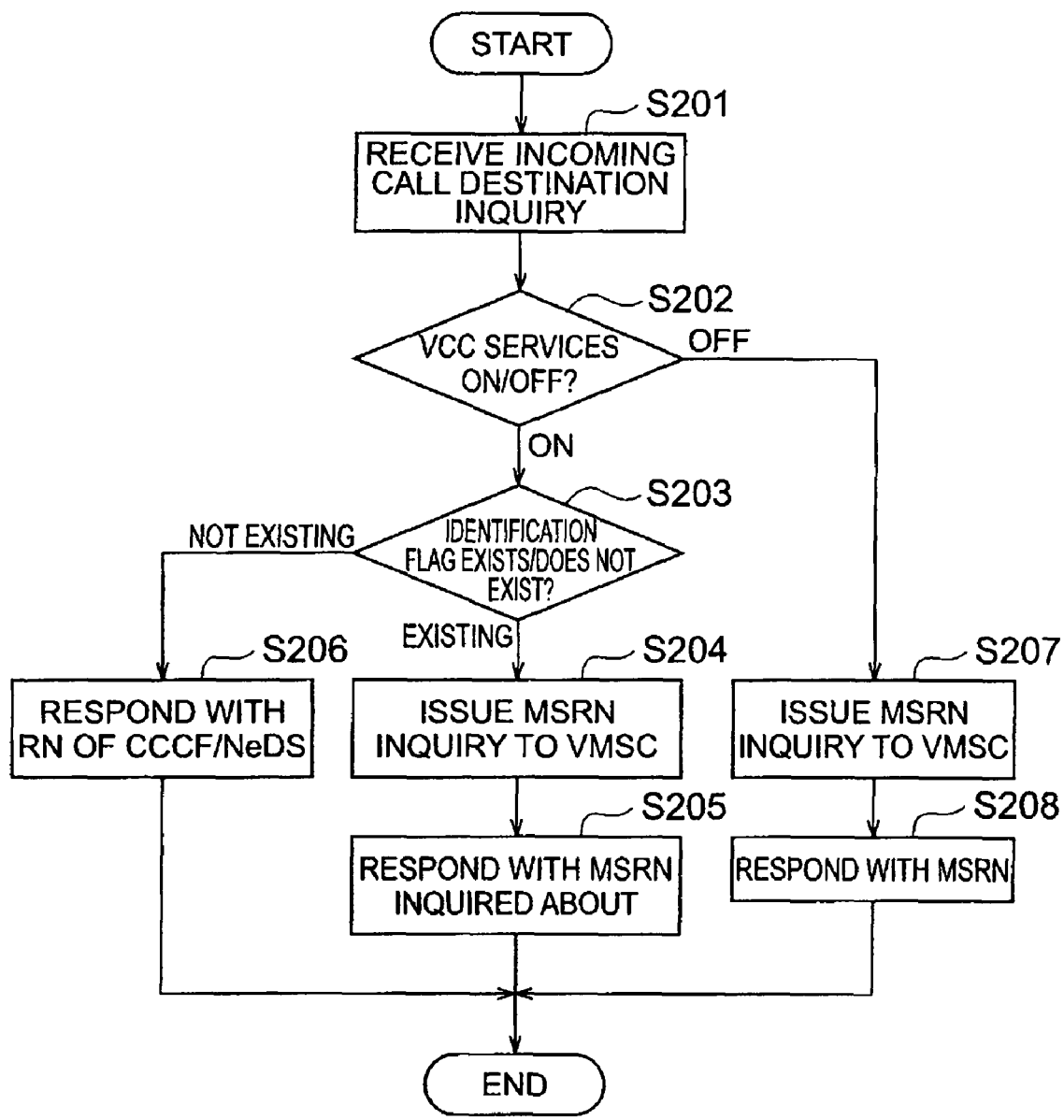
FIG. 4 is a flowchart showing the operation of the HSS 102.

The operation of the HSS 102 will be described next. FIG. 4 is a flowchart showing the operation of the HSS 102.

The inquiry reception unit 201 receives an inquiry signal representing an incoming call destination inquiry from the GMSC (S201). Here, in the HSS 102, the service judgment unit (not shown) judges whether VCC services are ON or OFF (S202). The VCC service settings are settings information which is set by the operator of the HSS 102 beforehand and is setting information for making settings to determine whether or not to perform handover processing. In cases where the VCC services are ON, it is judged by the flag judgment unit 202 whether there is an identification flag in the inquiry signal or not (S203). Here, in cases where it is judged that there is an identification flag, the VMSC inquiry unit 203 issues an inquiry regarding the mobile device routing number MSRN of the incoming call destination to the VMSC 107 and then acquires the routing number MSRN (S204). The response unit 205 then sends back the acquired routing number MSRN to the GMSC 101 (S205).

In addition, in cases where it is judged in S203 that there is no identification flag, the provisional routing number RN indicating the CCCF/NeDS 105 is assigned by the assignment unit 204 and is sent back by the response unit 205 to the GMSC 101 (S206).

Furthermore, in cases where it is judged by the service judgment unit in S202 that the VCC services are OFF, an inquiry regarding the routing number MSRN is issued to the VMSC 105 without judging whether the identification flag exists and the routing number MSRN is acquired (S207), and the acquired routing number MSRN is sent back to the GMSC 101 (S208).

By using an identification flag in this way, it is possible to prevent the inquiry processing by the GMSC 101 from entering a loop state by switching between sending back the provisional routing number RN of the CCCF/NeDS and sending back the routing number MSRN acquired from the VMSC 105.

Figure 5:
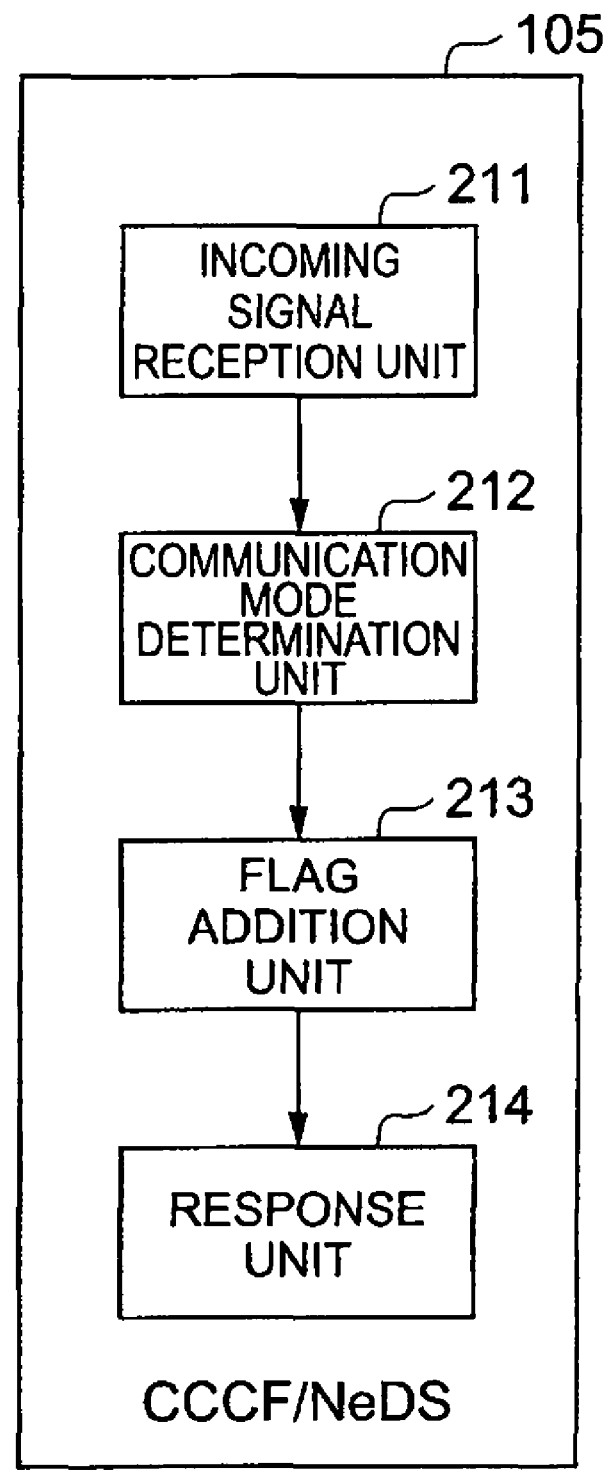
FIG. 5 is a function block diagram of a CCCF/NeDS 105.

The CCCF/NeDS 105, which adds an identification flag indicating the completion of the processing to determine the communication mode for the incoming call destination to the incoming signal, will be described next. FIG. 5 is a function block diagram of the CCCF/NeDS 105. The CCCF/NeDS 105 is constituted comprising an incoming signal reception unit 211, a communication mode determination unit 212, a flag addition unit 213 (addition means), and a response unit 214 (response means). Each constitution will be described hereinbelow. The CCCF/NeDS 105 is constituted by hardware such as a CPU, RAM, ROM, network control unit, and hard disk, and the CPU is capable of implementing the functions represented by the function blocks hereinbelow as a result of the CPU operating in accordance with a program stored in the ROM or hard disk.

The incoming signal reception unit 211 is a part which receives incoming signals which are transmitted by the GMSC 101. Upon receipt of an incoming signal, the incoming signal reception unit 211 outputs an instruction to the communication mode determination unit 212 to determine the communication mode.

The communication mode determination unit 212 is a part which determines the communication mode for the incoming call destination mobile device in accordance with a standard that is determined beforehand as mentioned earlier. For example, the communication mode determination unit 212 is capable of determining the use of the public mobile communications network or the wireless LAN so that the user is not charged more than the amount that has been preset in accordance with the rate schedule. When the communication mode is determined by the communication mode determination unit 212, the communication mode determination unit 212 outputs an instruction to add an identification flag to the flag addition unit.

The flag addition unit 213 is a part which adds an identification flag which indicates that processing to determine the incoming call destination communication mode is complete to the incoming signal in accordance with an instruction from the communication mode determination unit.

The response unit 214 is a part which sends back an incoming signal to which an identification flag has been added, to the GMSC 101.

As a result of being constituted in this way, the CCCF/NeDS 105 is able to add an identification flag to the incoming signal transmitted by the GMSC 101. Thus, in cases where an incoming call destination inquiry based on the incoming signal to which an identification flag has been added has been issued, the HSS 102 is able to judge whether the identification flag exists or not and perform processing suited to the existence/non-existence of an identification flag.

The action of the first embodiment will be described next. According to this embodiment, when, in the HSS 102, which is a Home Subscriber Server, the inquiry reception unit 201 receives an inquiry signal which represents an incoming call destination inquiry from the GMSC 101 which is a gateway mobile switching center, the flag judgment unit 202 judges whether an identification flag has been added. In cases where it is judged that an identification flag has not been added, the response unit 205 sends back a routing number RN which indicates the access destination of the CCCF/NeDS 105 assigned by the assignment unit 204 to the GMSC 101 and, in cases where it is judged that an identification flag has been added, the VMSC inquiry unit 203 acquires mobile device in-range information from the VMSC 107 which is a visited mobile-services switching center and the response unit 205 sends back the acquired in-range information to the GMSC 101. In addition, upon receipt of an incoming signal from the GMSC 101, the CCCF/NeDS 105 which is an application server is able to perform determination processing to determine the communication mode for the incoming call destination, add an identification flag indicating that the determination processing has ended to the incoming signal, and send back the incoming signal to which the identification flag has been added to the GMSC 101. As a result, it is possible to prevent a processing loop state resulting from the repetition of an inquiry for the HSS 102 whenever the GMSC 101 receives an incoming signal.

Second Embodiment

Figure 6:
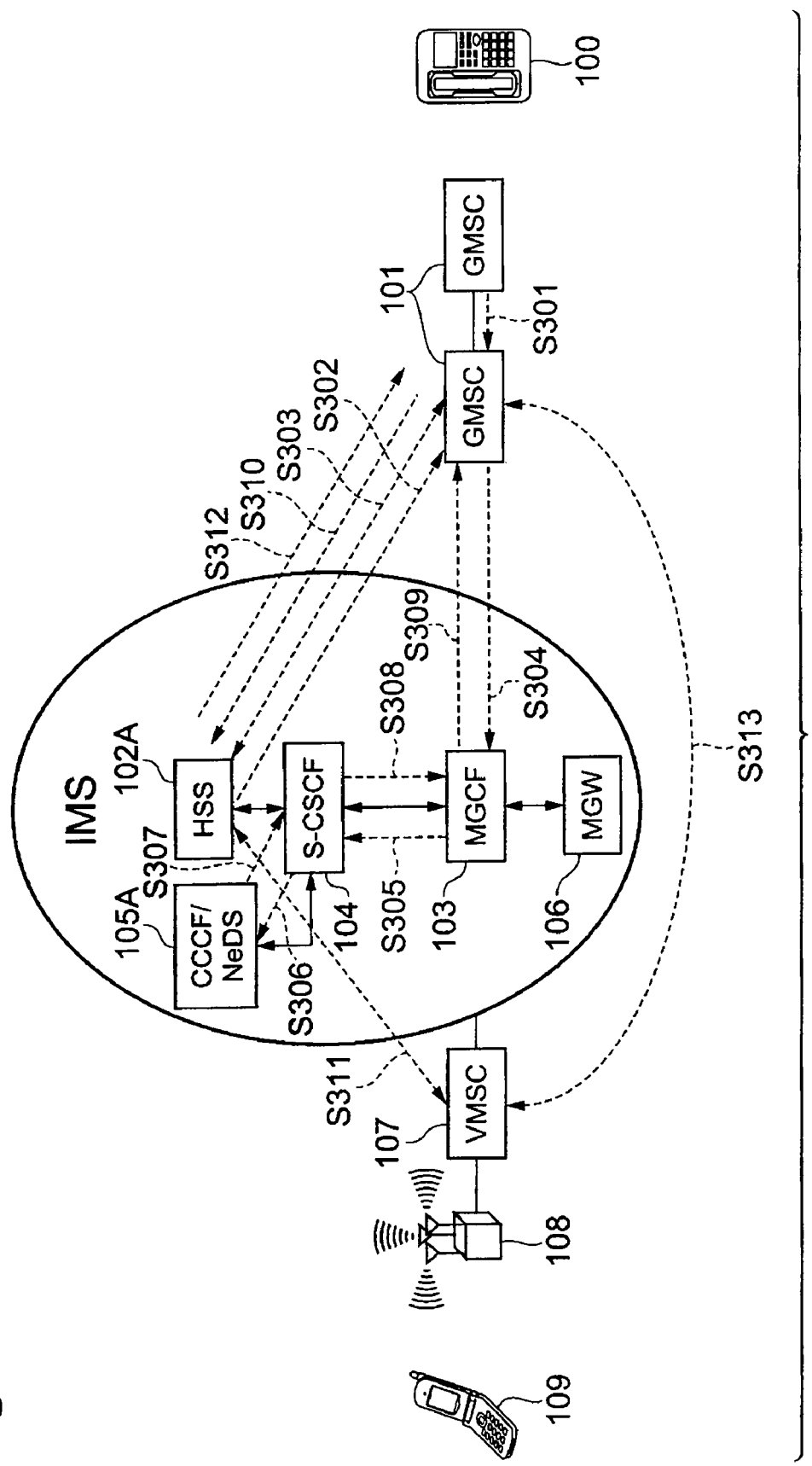
FIG. 6 is a system constitutional view of a communication system of a second embodiment.

The second embodiment will be described next. FIG. 6 is a system constitutional view of a communication system of the second embodiment. The communication system of the second embodiment is constituted comprising a GMSC 101, HSS 102A, MGCF 103, S-CSCF 104, a CCCF/NeDS 105A, an MGW 106, and a VMSC 107. The respective constituent elements will be described hereinbelow. The second embodiment operates in the same way as the first embodiment and a description thereof will be omitted.

The HSS 102A is a server that manages an authentication function and subscriber information of the 3G network and, unlike the HSS 102 of the first embodiment, the HSS 102A comprises a management table which stores call source information which indicates the call source (telephone number of the caller, for example) for judging, upon receipt of an inquiry signal of an incoming call destination inquiry from the GMSC 101, whether the signal is an inquiry signal which is received first or an inquiry signal which is received second.

Upon receipt of an inquiry signal from the GMSC 101, the HSS 102A references the management table and judges whether the call source information indicating the call source which is contained in the inquiry signal is stored in the management table. In cases where the call source information is stored in the management table, the HSS 102A judges that the inquiry signal is the second inquiry signal and acquires the routing number MSRN of the incoming call destination mobile device from the VMSC 107. In cases where the call source information is not stored in the management table, the HSS 102A judges that the inquiry signal is the first inquiry signal, assigns the provisional routing number RN of the CCCF/NeDS 105 to the inquiry signal and sends back the inquiry signal to the GMSC 101.

The CCCF/NeDS 105A determines the communication mode for the incoming call destination mobile device without adding an identification flag to the incoming signal and sends back a notice to that effect to the S-CSCF 104. The difference from the first embodiment is that the identification flag is not added.

The operation of the communication system constituted as detailed hereinabove will now be described by using FIG. 6. The broken lines represent the processing steps. The incoming signal processing is performed by the GMSC 101 and, when the incoming signal processing is performed by the GMSC 101 (S301), the inquiry signal indicating the incoming call destination inquiry is transmitted to the HSS 102A (S302). The HSS 102A judges whether the incoming signal is the first inquiry signal or the second inquiry signal by referencing the management table. Here, it is judged that the inquiry signal is the first inquiry signal and a provisional routing number RN which indicates the CCCF/NeDS 105A is sent back to the GMSC 101 (S302).

An incoming signal is then transmitted by the GMSC 101 to the CCCF/NeDS 105A via the MGCF 103 and S-CSCF 104 (S304, S305, S306). The communication mode for the incoming call destination mobile device is determined by the CCCF/NeDS 105A in accordance with the receipt of the incoming signal. In this embodiment, a communication mode which employs the CS domain (public mobile communications network or the like) is determined and an incoming signal to which the determined communication mode has been added is sent back to the S-CSCF 104 (S307). Thereafter, the incoming signal is sent back to the GMSC 101 via the MGCF 103 (S308, S309).

In the GMSC 101, the incoming signal sent back by the CCCF/NeDS 105A is treated as a normal incoming call and an inquiry signal representing an incoming call destination inquiry is transmitted to the HSS 102A (S310). In the HSS 102A, it is judged, by referencing the management table, that the inquiry signal thus transmitted is the second inquiry signal and the routing number MSRN of the incoming call destination mobile device is acquired from the VMSC 107 (S311). The acquired routing number MSRN is sent back to the GMSC 101 (S312) and communication connection processing for a connection to the VMSC 107 is performed by using the acquired routing number MSRN (S313).

Thus, the HSS 102A comprises a management table and judges whether the incoming call destination inquiry signal is received first or received second. In cases where the incoming call destination inquiry signal is received first, a routing number RN which indicates the CCCF/NeDS 105A is assigned and, in cases where the incoming call destination inquiry signal is received second, the routing number MSRN acquired from the VMSC 107 is assigned, whereby the incoming call destination inquiry processing of the GMSC 101 can be prevented from entering a loop state.

Figure 7:
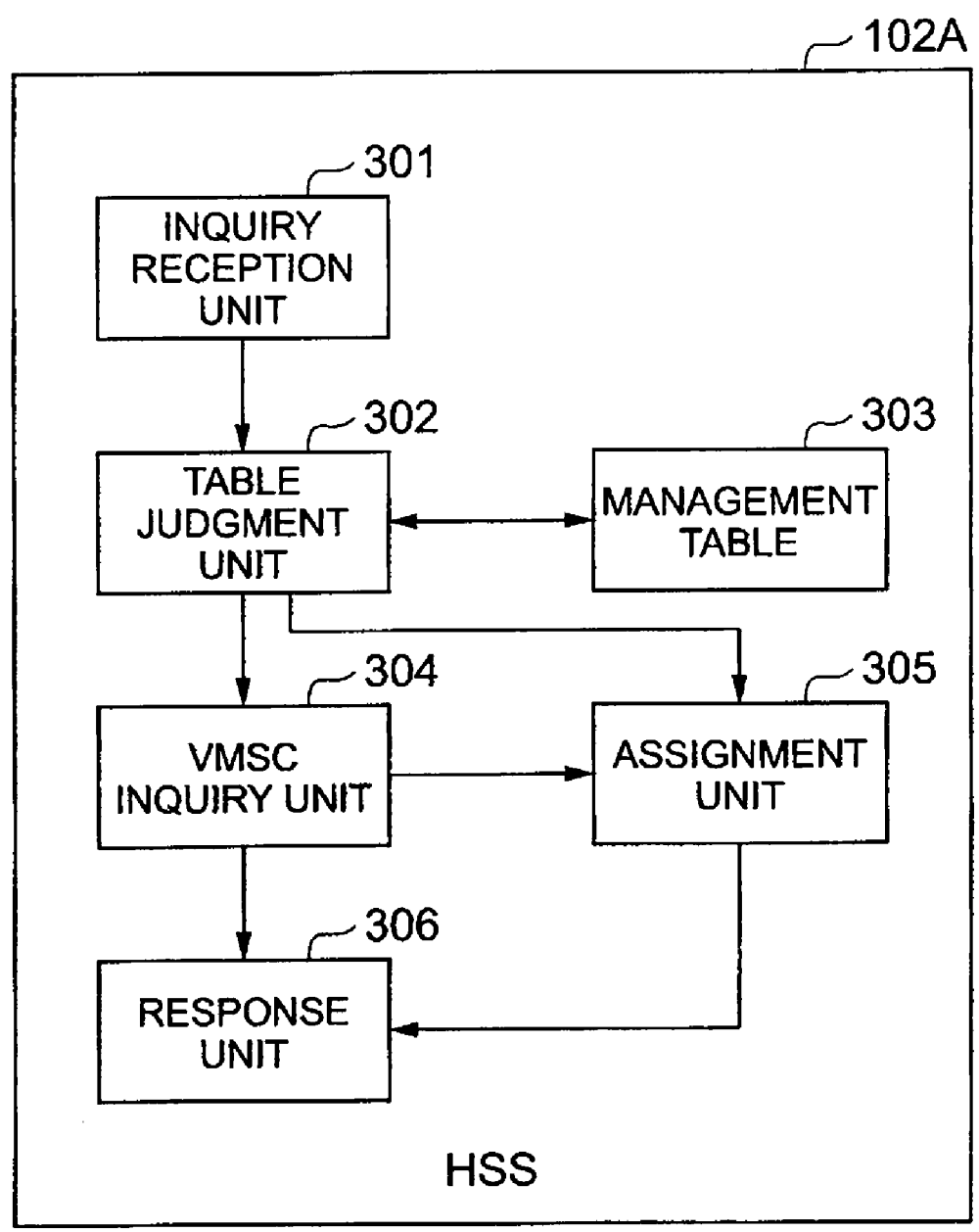
FIG. 7 is a function block diagram of an HSS 102A.

The constitution of the HSS 102A of the second embodiment will be described next. FIG. 7 is a function block diagram of the HSS 102A of the second embodiment. The HSS 102A is constituted comprising an inquiry reception unit 301, a table judgment unit 302 (judgment means), a management table 303 (storage means), a VMSC inquiry unit 304, an assignment unit 305, and a response unit 306 (response means). The respective constitutions will be described hereinbelow.

The inquiry reception unit 301 is a part that receives inquiry signals from the GMSC 101.

The table judgment unit 302 is a part that judges whether the inquiry signal from the same call source is a signal which is received first or a signal which is received second. The table judgment unit 302 is able to judge whether the inquiry signal is a signal which is received first or whether the inquiry signal is a signal which is received second on the basis of call source information indicating a call source which is stored in the management table 303. In cases where it is judged that the inquiry signal is a signal which is received first, the table judgment unit 302 outputs an instruction to the assignment unit 305 to instruct the assignment unit 305 to assign a provisional routing number RN which represents the CCCF/NeDS 105A, and registers call source information in the management table 303. In cases where it is judged that the inquiry signal is a signal which is received second, the table judgment unit 302 outputs an instruction to the VMSC inquiry unit 304 to instruct the VMSC inquiry unit 304 to acquire a routing number MSRN which is position information on the incoming call destination mobile device from the VMSC 107 and deletes one call source information item which corresponds with the acquisition processing of the routing number MSRN registered in the management table 303.

The VMSC inquiry unit 304 is a part which makes an inquiry to the VMSC 107 regarding the routing number MSRN which is position information on the incoming call destination mobile device and acquires the routing number MSRN on the basis of an instruction from the table judgment unit 302.

The assignment unit 305 acquires a provisional routing number RN which represents the CCCF/NeDS 105A on the basis of the instruction from the table judgment unit 302.

The response unit 306 is a part which sends back a provisional routing number RN of the mobile device acquired by the VMSC inquiry unit 304 or the routing number MSRN, which represents the CCCF/NeDS 105A, acquired by the assignment unit 305 to the GMSC 101.

The HSS 102A with this constitution is constituted by hardware such as a CPU, RAM, ROM, network control unit, and hard disk, and the CPU is capable of implementing the functions represented by the function blocks hereinabove as a result of the CPU operating in accordance with a program stored in the ROM or hard disk. For example, the HSS 102A has the same constitution as that of the hard block diagram shown in FIG. 3.

Figure 8:
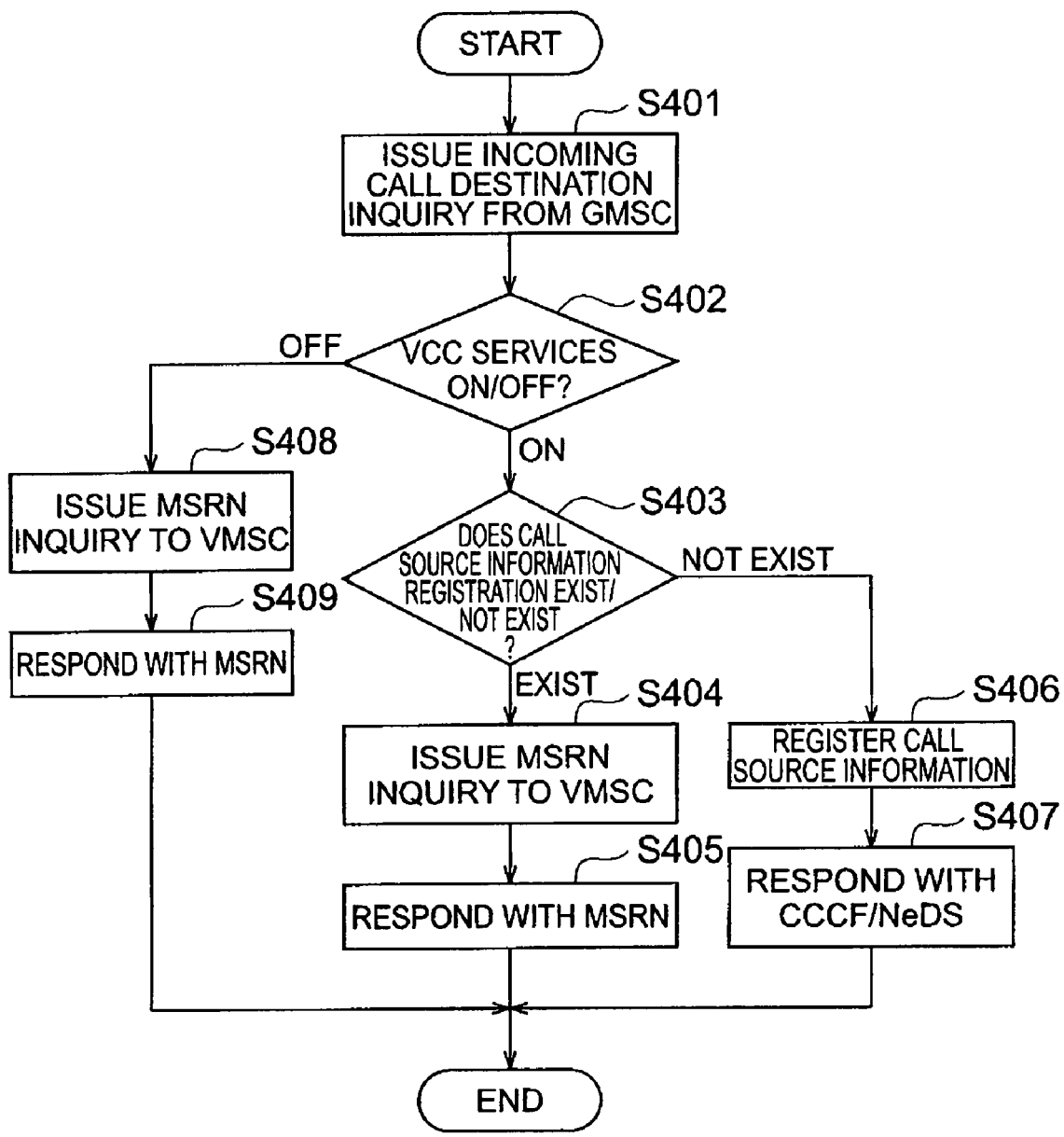
FIG. 8 is a flowchart showing the operation of the HSS 102A.

The operation of the HSS 102A constituted in this manner will be described next. FIG. 8 is a flowchart showing the operation of the HSS 102A.

First, an inquiry signal is received from the GMSC 101 by the inquiry reception unit 301 (S401). The HSS 102A judges whether the VCC services are in an ON state or in an OFF state (S402). In cases where the VCC services are in an ON state, the table judgment unit 302 judges whether the registration of the caller exists in the management table 303 (S403). Here, in cases where it is judged by the table judgment unit 302 that the management table 303 has been registered, it is judged that the second inquiry signal has been received and the routing number MSRN of the incoming call destination mobile device is acquired from the VMSC 107 by the VMSC inquiry unit 304 (S404). The acquired routing number MSRN is sent back to the GMSC 101 by the response unit 306 as a response (S405). The routing number MSRN of the mobile device is also acquired and the corresponding call source information is deleted from the management table 303.

In addition, in cases where it is judged by the table judgment unit 302 in S403 that call source information which indicates a caller has not been registered in the management table 303, call source information which indicates the caller contained in the inquiry signal (the telephone number of the caller, for example) is acquired by the table judgment unit 302 and registered in the management table 303 (S406). In cases where there is no caller telephone number, temporary identification information which makes it possible to uniquely specify the call source can be assigned. Further, the routing number RN of the CCCF/NeDS 105A acquired by the assignment unit 305 as a response is sent back by the response unit 306 (S407).

The action of the communication system of the second embodiment will be described next. With this embodiment, when the HSS 102A receives an inquiry signal from the GMSC 101, the table judgment unit 302 judges whether the call source information indicating the call source of the incoming signal is stored in the management table 303. In addition, in cases where it is judged by the table judgment unit 302 that the call source information has not been stored in the management table 303, call source information which indicates the call source of the incoming signal is stored in the management table 303 and, in cases where it is judged that call source information has not been stored in the management table 303, the response unit 306 sends back the routing number RN of the CCCF/NeDS 105A to the GMSC 101. In addition, in cases where it is judged by the table judgment unit 302 that the call source information has been stored in the management table 303, the routing number MSRN of the incoming call destination mobile device can be sent back from the VMSC 107 to the GMSC 101. As a result, the GMSC 101 is able to prevent a processing loop state resulting from the repetition of an inquiry for the HSS 102A whenever the GMSC 101 receives an incoming signal.

Third Embodiment

Figure 9:
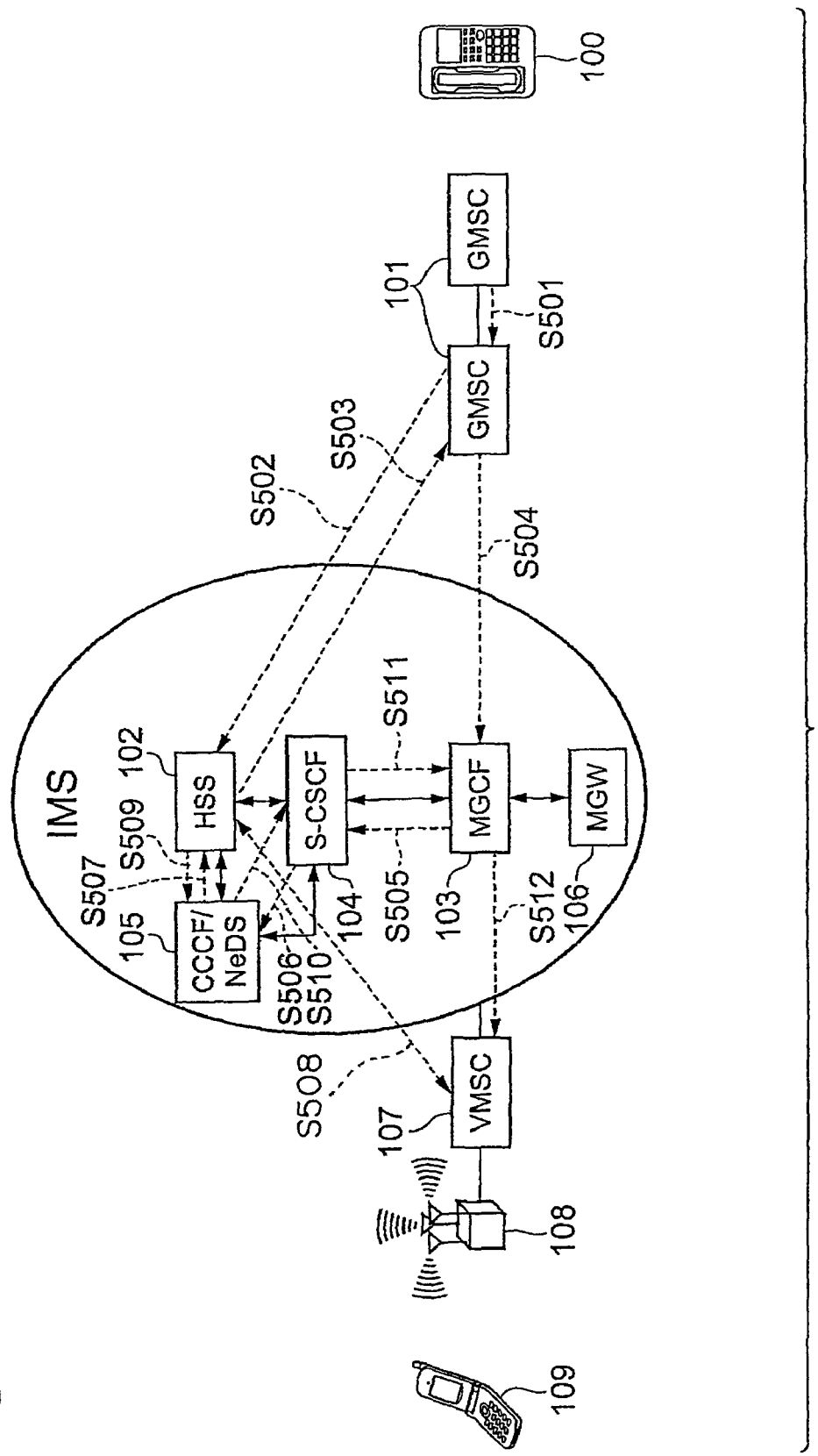
FIG. 9 is a system constitutional view of a communication system of a third embodiment.

The third embodiment will be described next. FIG. 9 is a system constitution view of the communication system of the third embodiment. The communication system is constituted comprising GMSC 101, an HSS 102B, a MGCF 103, an S-CSCF 104, a CCCF/NeDS 105B, an MGW 106, a VMSC 107, and a base station 108. The communication system of the third embodiment differs from the communication systems of the first embodiment and second embodiment in that the CCCF/NeDS 105B issues an incoming call destination inquiry to the HSS 102B. The constitution and operation thereof will be described hereinbelow. A description of devices which are the same as those of the first and second embodiments will be omitted.

The HSS 102B is a part which, upon receipt of an inquiry signal from the GMSC 101 or an inquiry signal from the CCCF/NeDS 105B, discriminates the inquiry source and performs processing which corresponds with the inquiry source. More specifically, in cases where an inquiry signal is received from the CCCF/NeDS 105B, the HSS 102B performs an inquiry regarding the routing number MSRN which is position information on the incoming call destination mobile device and acquires the routing number MSRN from the VMSC 107. Furthermore, in cases where an inquiry signal is received from the GMSC 101, the HSS 102B acquires the routing number MSRN of the mobile device from the VMSC 107 in the event of a service ON state depending on the ON/OFF state of the VCC services. In addition, in the event of a services OFF state, the HSS 102B acquires the routing number RN of the CCCF/NeDS 105B.

Upon receipt of an incoming signal from the S-CSCF 104, the CCCF/NeDS 105B determines the communication mode for the incoming call destination mobile device on the basis of a preset standard. For example, the communication mode is preferably determined such that the amount of money charged is equal to or less than a preset amount of money as per the first embodiment. In cases where a CS domain (public mobile communications network or the like) communication mode has been determined, the CCCF/NeDS 105B issues an inquiry regarding the routing number MSRN of the incoming call destination mobile device to the HSS 102B and acquires the routing number MSRN therefrom. The CCCF/NeDS 105B then transmits the acquired routing number MSRN to the MGCF 103 and makes a communication connection via the public mobile communications network. In cases where a communication mode employing a wireless LAN has been determined, the CCCF/NeDS 105B issues a call control instruction to the S-CSCF 104 and makes a communication connection via the S-CSCF 104.

The operation of the communication system of the third embodiment will be described hereinbelow using FIG. 9. The broken lines represent the processing steps. First, the GMSC 101 receives an incoming signal from the mobile device 100 (S501). An inquiry signal representing an incoming call destination inquiry is transmitted by the GMSC 101 to the HSS 102B in response to the reception of the incoming signal (S502). The HSS 102B identifies that the incoming signal has arrived at the mobile device, acquires the routing number RN which represents the CCCF/NeDS 105B, and sends back the routing number RN by way of a response (S503).

The GMSC 101 transmits the incoming signal to the CCCF/NeDS 105B via the MGCF 103 and S-CSCF 104 in the incoming signal processing (S504, S505, S506). The CCCF/NeDS 105B determines the communication mode for the incoming call destination mobile device and determines a communication mode which employs the CS domain (public mobile communications network or the like) here. After determining the communication mode, the CCCF/NeDS 105B transmits an inquiry signal which indicates an incoming call destination inquiry to the HSS 102B (S507).

The HSS 102B judges the call source of the inquiry signal thus received. Here, the HSS 102B judges that the inquiry is from the CCCF/NeDS 105B and issues an inquiry regarding the routing number MSRN of the incoming call destination mobile device to the VMSC 107, and the HSS 102B acquires the routing number MSRN (S508). The routing number MSRN of the incoming call destination mobile device is then sent back by the HSS 102B to the CCCF/NeDS 105B (S509) and transmitted to the MGCF 103 via the S-CSCF 104 (S510, S511). The MGCF 103 uses the routing number MSRN of the incoming call destination mobile device and performs a communication connection to the VMSC 107 via the MGW 106 (S512).

Thus, after determining the communication mode for the incoming call destination mobile device, the CCCF/NeDS 105B issues an inquiry regarding the routing number MSRN of the incoming call destination mobile device to the HSS 102B and, by acquiring the routing number MSRN by way of response to the inquiry, the HSS 102B is able to prevent the processing of the inquiry regarding the routing number MSRN of the mobile device of the GMSC 101 from entering a loop state.

Figure 10:
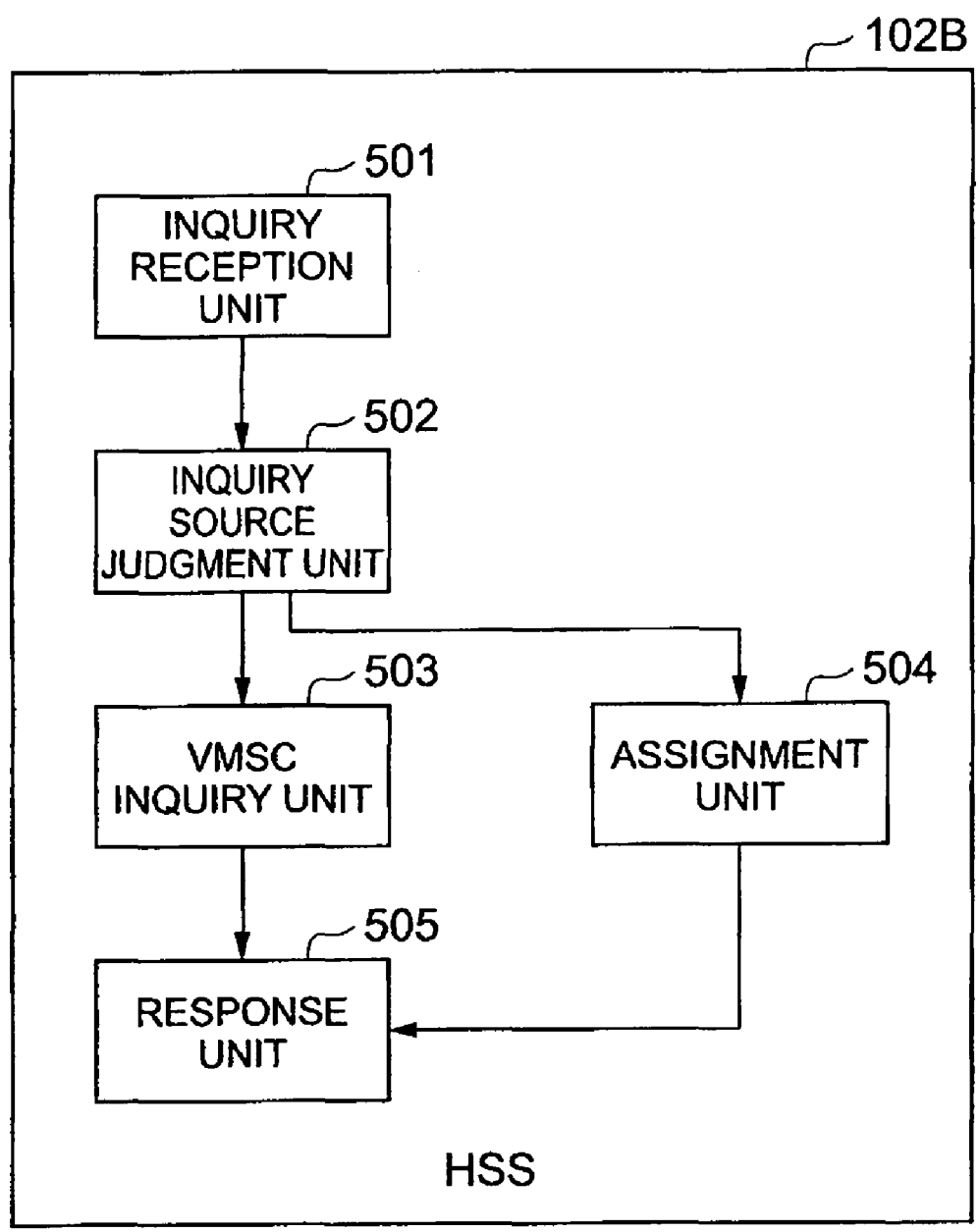
FIG. 10 is a function block diagram of an HSS 102B.

The constitution of the HSS 102B of the communication system thus constituted will be described next. FIG. 10 is a function block diagram of the HSS 102B of the third embodiment. The HSS 102B is constituted comprising an inquiry reception unit 501, an inquiry source judgment unit 502 (inquiry source judgment means), a VMSC inquiry unit 503, an assignment unit 504, and a response unit 505 (response means). The respective constitutions will be described hereinbelow.

The inquiry reception unit 501 is a part which receives an inquiry signal from the GMSC 101 or CCCF/NeDS 105B.

The inquiry source judgment unit 502 is a part which judges whether an inquiry is an inquiry from the GMSC 101 or an inquiry from the CCCF/NeDS 107 on the basis of the call source information contained in the inquiry signal. In cases where there is an inquiry from the CCCF/NeDS 105B in accordance with the call source ascertained, the inquiry source judgment unit 502 outputs an instruction to the VMSC inquiry unit 503 and, in cases where there is an inquiry from the GMSC 101, the inquiry source judgment unit 502 outputs an instruction to the assignment unit 504.

The VMSC inquiry unit 503 is a part which issues an inquiry regarding the routing number MSRN of the incoming call destination mobile device to the VMSC 107 in accordance with the instruction from the inquiry source judgment unit 502 and acquires the routing number MSRN from the VMSC 107. The VMSC inquiry unit 503 outputs the acquired routing number MSRN to the response unit 505.

The assignment unit 504 is a part which assigns and acquires the routing number RN of the CCCF/NeDS 105B in accordance with the instruction from the inquiry source judgment unit 502. The assignment unit 504 outputs the acquired routing number RN to the response unit 505.

The response unit 505 is a part which sends back a routing number MSRN or routing number RN which is output by the VMSC inquiry unit 503 or the assignment unit 504 to the call source (CCCF/NeS105B or GMSC 101).

The HSS 102B which is constituted in this way is constituted by hardware such as a CPU, RAM, ROM, network control unit, or hard disk and the CPU is capable of implementing the functions represented by the function blocks above as a result of the CPU operating in accordance with a program stored in the ROM or hard disk. For example, the HSS 102B has the same constitution as that of the hard block diagram shown in FIG. 3.

Figure 11:
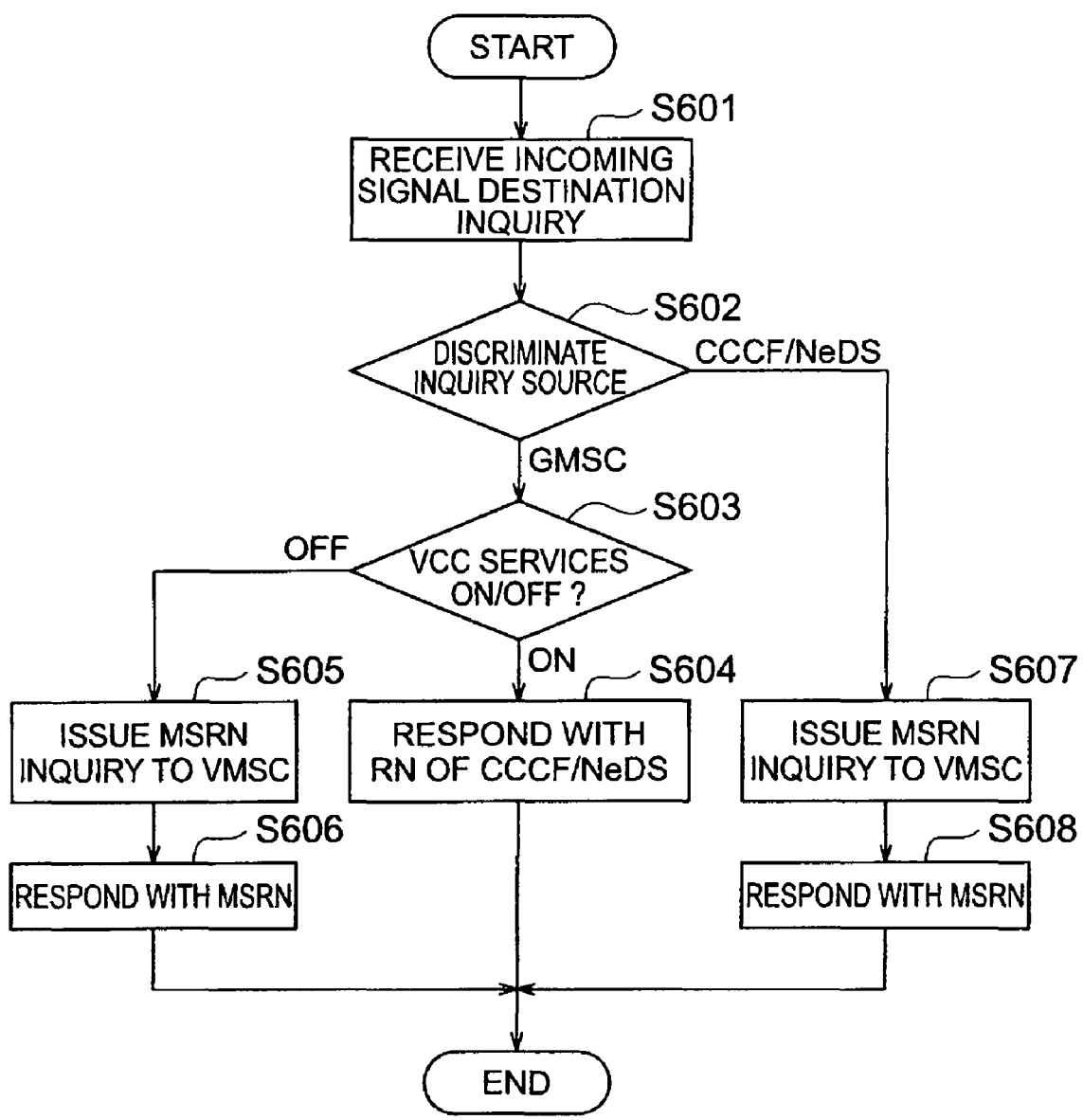
FIG. 11 is a flowchart showing the operation of the HSS 102B.

The operation of the HSS 102B constituted in this way will be described. FIG. 11 is a flowchart which shows the operation of the HSS 102B.

An inquiry signal which represents an incoming call destination inquiry is received by the inquiry reception unit 501 (S601). It is judged by the inquiry source judgment unit 502 whether the inquiry signal is an inquiry from the GMSC 101 or an inquiry from the CCCF/NeDS 105B on the basis of the inquiry source (call source) information contained in the inquiry signal (S602). In cases where it is judged by the inquiry source judgment unit 502 in S602 that the inquiry signal is an inquiry from the GMSC 101, a service judgment unit (not shown) judges whether the VCC services are in an ON state or an OFF state (S603). Here, in cases where it is judged that the VCC services are in an ON state, a routing number RN which represents the CCCF/NeDS 105B is assigned and sent back by way of a response (S604).

Furthermore, in cases where it is judged in S603 that the VCC services are in an OFF state, the inquiry regarding the routing number MSRN of the incoming call destination mobile device is issued to the VMSC 107 and acquired by the VMSC inquiry unit 503 (S605) and the routing number MSRN is sent back by the response unit 505 by way of a response (S606).

In S602, in cases where it is judged by the inquiry source judgment unit 502 that the inquiry source is the CCCF/NeDS 105B, an inquiry regarding the routing number MSRN of the incoming call destination mobile device is issued to the VMSC 107 by the VMSC inquiry unit 503 and acquired thereby (S607) and the routing number MSRN is sent back by the response unit 505 by way of a response (S608).

Figure 12:
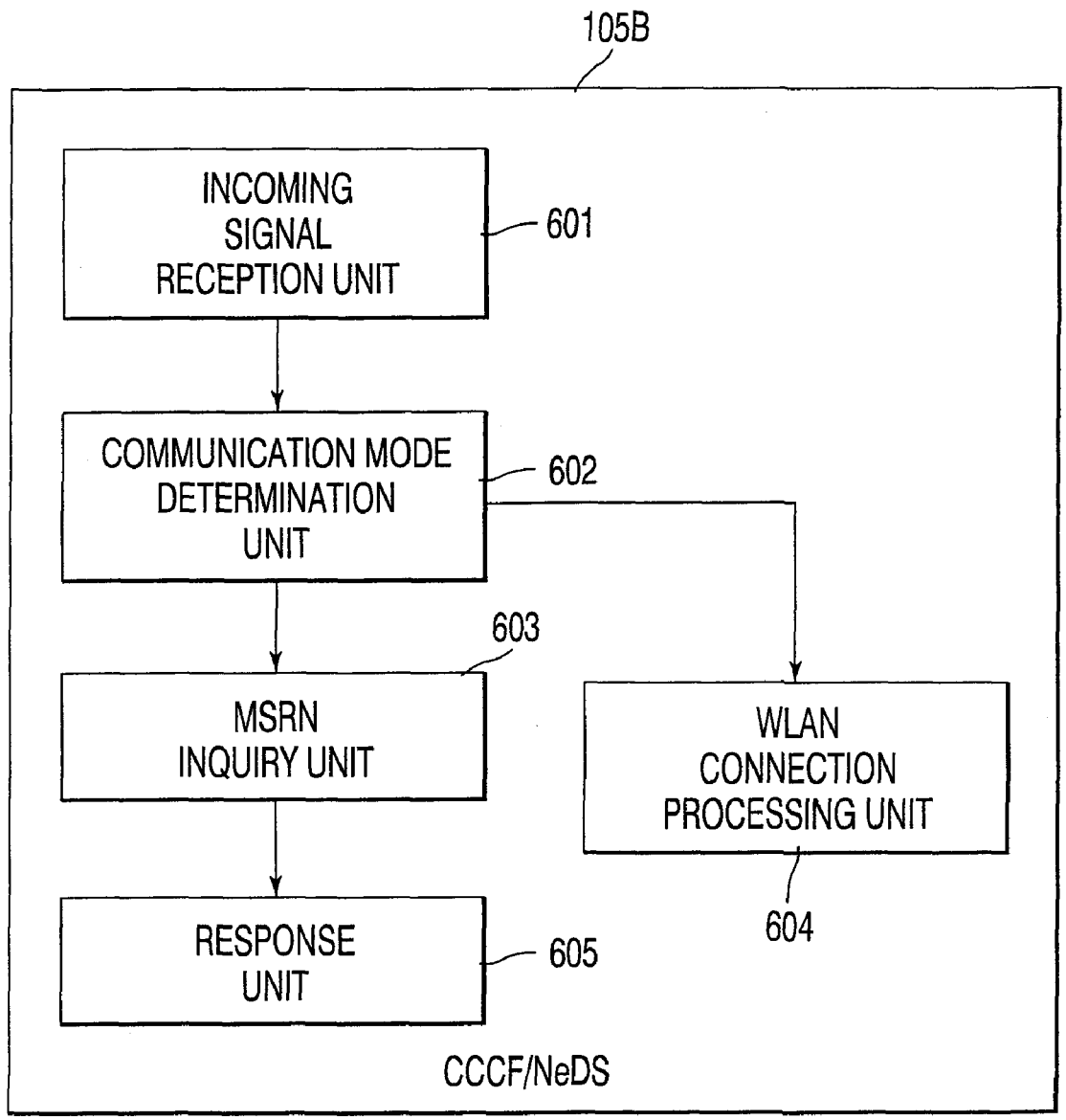
FIG. 12 is a function block diagram of a CCCF/NeDS 105B.

The constitution of the CCCF/NeDS 105B will be described next. FIG. 12 is a function block diagram of the CCCF/NeDS 105B. The CCCF/NeDS 105B is constituted comprising an incoming signal reception unit 601, a communication mode determination unit 602, an MSRN inquiry unit 603 (inquiry means), a WLAN connection processing unit 604, and a response unit 605 (communication processing means). The respective constitutions will be described hereinbelow. The CCCF/NeDS 105B is constituted by hardware such as a CPU, RAM, ROM, a network control unit, and a hard disk, and the CPU is capable of implementing the functions represented by the function blocks above as a result of the CPU operating in accordance with a program stored in the ROM or hard disk.

The incoming signal reception unit 601 is a part which receives an incoming signal from the GMSC 101.

The communication mode determination unit 602 is a part which, upon receipt of the incoming signal from the incoming reception unit 601, determines the communication mode for the incoming call destination mobile device. This determination can be made by the user on the basis of the rate schedule as mentioned earlier.

The MSRN inquiry unit 603 is a part which, in cases where a communication mode that employs a public mobile communications network has been determined by the communication mode determination unit 602, issues an inquiry regarding the routing number MSRN of the incoming call destination mobile device to the HSS 102B and acquires the routing number MSRN therefrom. The MSRN inquiry unit 603 outputs the acquired routing number MSRN to the response unit 605.

The WLAN connection processing unit 604 is a part which, in cases where a communication mode that employs a wireless LAN has been determined by the communication mode determination unit 602, forms a communication connection which employs the S-CSCF 104.

The response unit 605 is a part which sends back the incoming call destination routing number MSRN to the MGCF 103.

Figure 13:
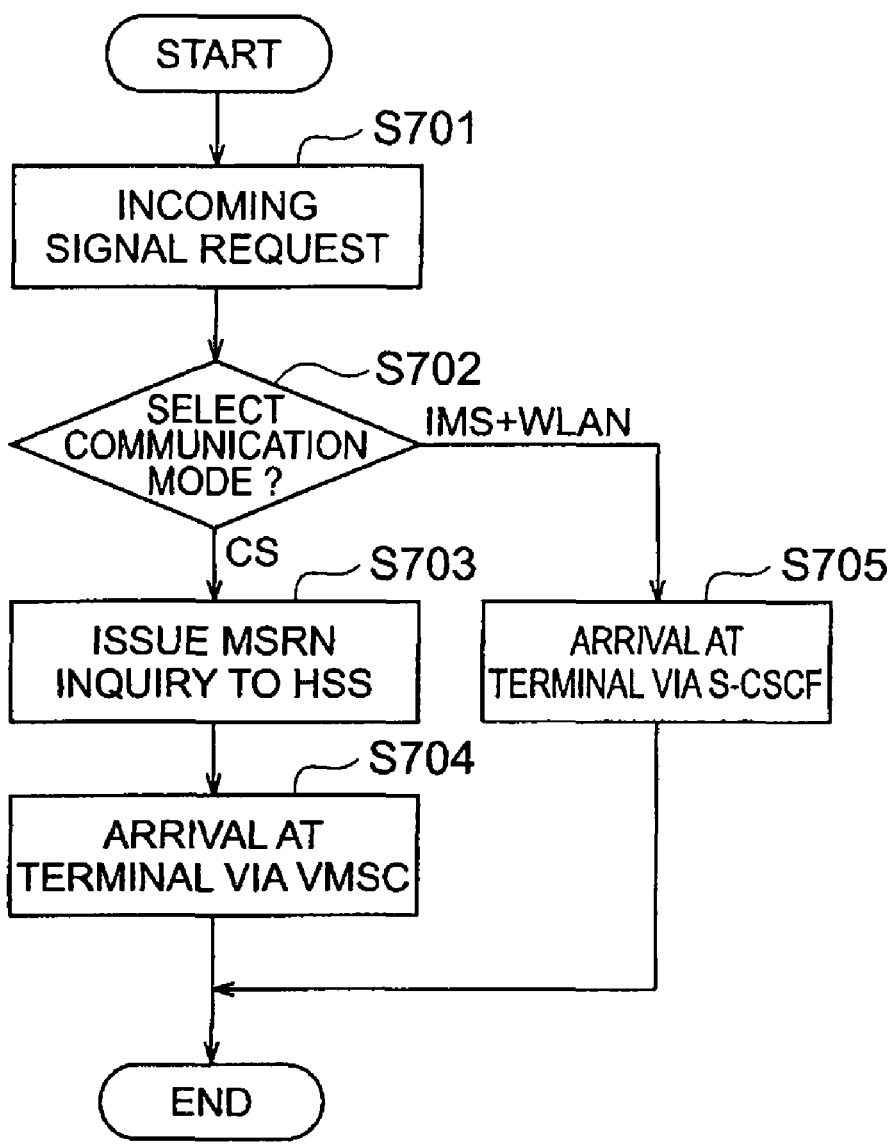
FIG. 13 is a flowchart showing the operation of the CCCF/NeDS 105B.
Figure 14:
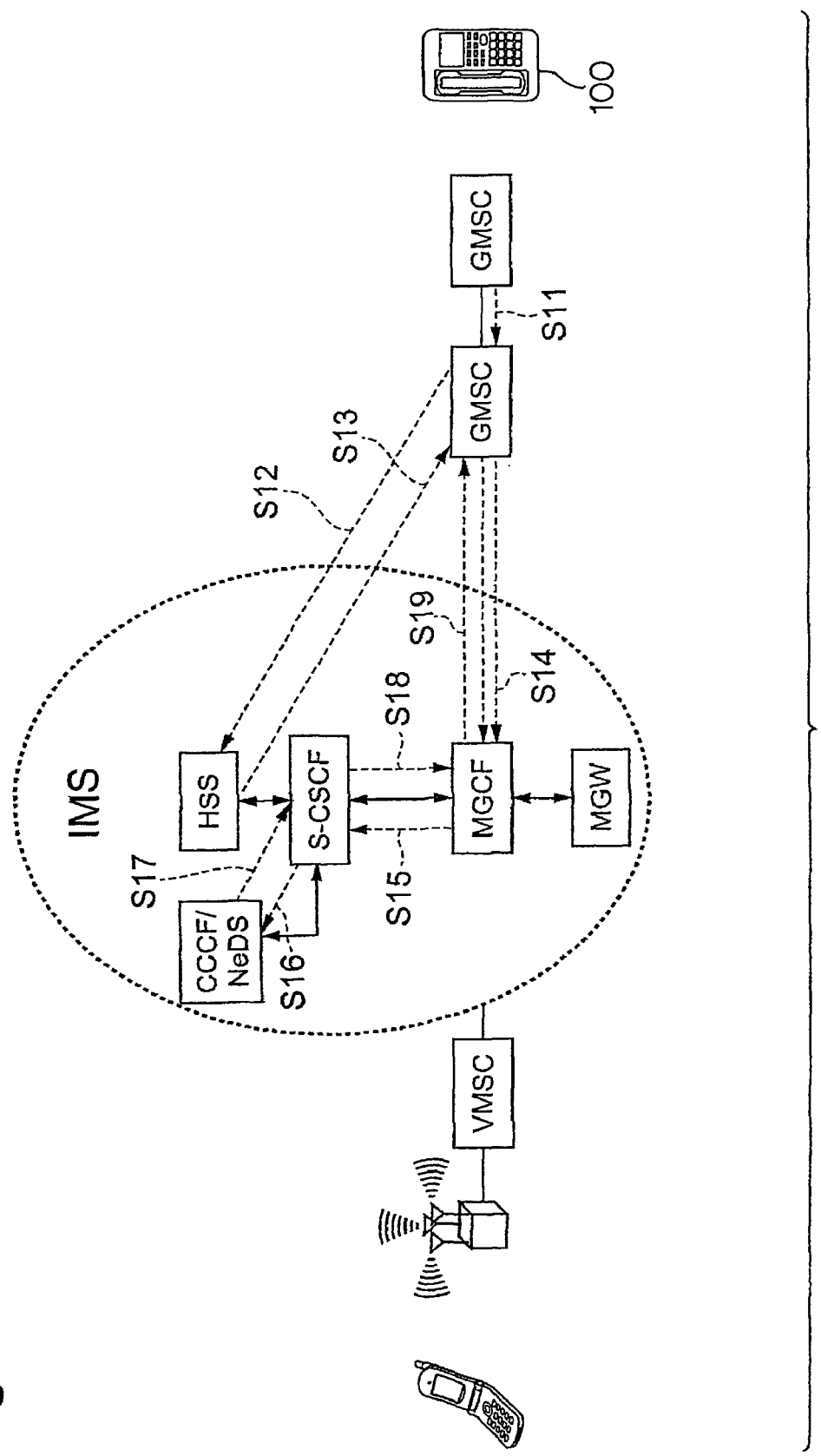
FIG. 14 is a network constitutional view of the network constitution of the whole communication system.

The operation of the CCCF/NeDS 105B thus constituted will be described next. FIG. 13 is a flowchart which shows the operation of the CCCF/NeDS 105B.

The incoming signal reception unit 601 receives an incoming signal (S701). The communication mode of the incoming call destination mobile device is then selected in accordance with a preset standard (S702). Here, in cases where a communication mode which employs the CS domain (public mobile communications network) is determined by the communication mode determination unit 602, an inquiry regarding the routing number MSRN of the mobile device is issued to the HSS 102B by the MSRN inquiry unit 603 (S704). The routing number MSRN acquired as a result of the inquiry is sent back by the response unit 605, whereupon the MGCF 103 makes a communication connection with the VMSC 107 and a communication connection with the mobile device 109 (S704).

Furthermore, in cases where a communication mode which employs a wireless LAN (IMS+WLAN) has been selected by the communication mode determination unit 602 in S702, an instruction to that effect is sent to the S-CSCF 104 and a communication connection is made by using the wireless LAN via the S-CSCF 104 (S705).

The action of the third embodiment will be described next. According to this embodiment, in the HSS 102B, the inquiry source judgment unit 302 judges whether an inquiry signal is received from the GMSC 101 or whether an inquiry signal is received from the CCCF/NeDS 105. In cases where it is judged by the inquiry source judgment unit 502 that an inquiry signal has been received from the CCCF/NeDS 105B, the response unit 505 sends back the routing number MSRN of the incoming call destination mobile device acquired from the VMSC 107 by the VMSC inquiry unit 503 and, in cases where it is judged that an inquiry signal has been received from the GMSC 101, the response unit 505 sends back the routing number RN of the CCCF/NeDS 105B. In addition, in cases where the CCCF/NeDS 105B receives an incoming signal, the communication mode determination unit 602 determines the incoming call destination communication mode and the MSRN inquiry unit 603 transmits an incoming call destination-related inquiry signal to the HSS 102B. In cases where the routing number RN of the incoming call destination mobile device is received in response to the transmitted inquiry signal, the communication processing can be carried out by using the routing number RN. As a result, the GMSC 101 is able to prevent a processing loop state resulting from the repetition of an inquiry for the HSS 102B whenever the GMSC 101 receives an incoming signal.

The invention claimed is:

1. A communication system, comprising:
a visitor mobile-services switching center which stores in-range information regarding a mobile device and performs communication processing for the mobile device;
a home subscriber server which acquires in-range information regarding an incoming call destination from the visitor mobile-services switching center;
an application server which determines a communication mode for the incoming call destination; and
a gateway mobile switching center which, upon receipt of an incoming signal, transmits an inquiry signal which represents an incoming call destination inquiry to the home subscriber server and which, upon receipt of a response of access information indicating the incoming call destination from the home subscriber server, transmits an incoming signal to a destination, based on the access information, wherein
the home subscriber server comprises:
a flag judgment unit to judge whether an identification flag has been added, upon receipt of an inquiry signal which represents an incoming call destination inquiry from the gateway mobile switching center; and
a response unit to send back access information indicating the access destination of the application server to the gateway mobile switching center in cases where judgment is made by the flag judgment unit that the identification flag has not been added and, in cases where judgment is made that the identification flag has been added, acquiring in-range information regarding the mobile device from the visitor mobile-services switching center and sending back the acquired in-range information to the gateway mobile switching center; and
the application server comprises:
an addition unit to, upon receipt of an incoming signal from the gateway mobile switching center, perform determination processing to determine the communication mode for the incoming call destination, and to add an identification flag indicating that the determination processing is complete to the incoming signal; and
a response unit for sending back the incoming signal, to which the identification flag has been added by the addition unit, to the gateway mobile switching center.

2. The communication system according to claim 1, wherein the flag judgment unit does not determine whether an identification flag has been added when VCC services are determined to be off.

3. The communication system according to claim 2 wherein the response unit sends the back access information irrespective of the identification flag when the VCC services are determined to be off.

4. A communication method for a communication system having a visitor mobile-services switching center which stores in-range information regarding a mobile device and performs communication processing for the mobile device, a home subscriber server which acquires in-range information regarding an incoming call destination from the visitor mobile-services switching center, an application server which determines a communication mode for the incoming call destination, and a gateway mobile switching center which, upon receipt of an incoming signal, transmits an inquiry signal which represents an incoming call destination inquiry to the home subscriber server and which, upon receipt of a response of access information indicating the incoming call destination from the home subscriber server, transmits an incoming signal to a destination, based on the access information, the communication method, comprising:
determining, upon receipt of an incoming signal from the gateway mobile switching center and by the application server, a communication mode for the incoming call destination and adds an identification flag which indicates that the determination processing is complete to the incoming signal; and
sending back, by the application server, an incoming signal, to which the identification flag is added in the addition, to the gateway mobile switching center,
the communication method further comprising:
judging, upon receipt of an inquiry signal which represents an incoming call destination inquiry from the gateway mobile switching center and at the home subscriber server, whether the identification flag has been added; and
sending back, in cases where judgment is made in the flag judgment that the identification flag has not been added and by the home subscriber server, access information indicating an access destination of the application server to the gateway mobile switching center and, in cases where judgment is made that the identification flag has been added, acquiring in-range information regarding the mobile device from the visitor mobile-services switching center and sending back the acquired in-range information to the gateway mobile switching center.

* * * * *